US011974291B2

(12) United States Patent
Liu et al.

(10) Patent No.: US 11,974,291 B2
(45) Date of Patent: Apr. 30, 2024

(54) ACTIVATION AND RELEASE FOR GROUP-COMMON DOWNLINK CHANNELS WITH REPETITIONS

(71) Applicant: QUALCOMM Incorporated, San Diego, CA (US)

(72) Inventors: Le Liu, Fremont, CA (US); Kazuki Takeda, Tokyo (JP); Alberto Rico Alvarino, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 17/220,749

(22) Filed: Apr. 1, 2021

(65) Prior Publication Data

US 2022/0322406 A1 Oct. 6, 2022

(51) Int. Cl.
| | |
|---|---|
| *H04W 76/11* | (2018.01) |
| *H04L 1/1812* | (2023.01) |
| *H04L 5/00* | (2006.01) |
| *H04W 72/044* | (2023.01) |

(Continued)

(52) U.S. Cl.
CPC .......... *H04W 72/23* (2023.01); *H04L 1/1812* (2013.01); *H04L 5/0055* (2013.01); *H04W 72/044* (2013.01); *H04W 72/1273* (2013.01)

(58) Field of Classification Search
None
See application file for complete search history.

(56) References Cited

U.S. PATENT DOCUMENTS

| | | | |
|---|---|---|---|
| 10,965,434 B1 | 3/2021 | Babaei | |
| 2013/0301582 A1* | 11/2013 | Jiang | H04W 72/23 370/329 |
| 2020/0029283 A1* | 1/2020 | Lei | H04W 72/21 |

(Continued)

FOREIGN PATENT DOCUMENTS

| | | |
|---|---|---|
| WO | WO-2020172764 A1 | 9/2020 |
| WO | WO-2022076130 A1 | 4/2022 |

OTHER PUBLICATIONS

International Search Report and Written Opinion—PCT/US2022/018308—ISA/EPO—dated Jun. 20, 2022.

(Continued)

*Primary Examiner* — Sithu Ko
(74) *Attorney, Agent, or Firm* — Holland & Hart LLP

(57) ABSTRACT

Methods, systems, and devices for wireless communications are described. A user equipment (UE) may activate or release one or more semi-persistent scheduling (SPS) configurations for group-common downlink shared channels based on signaling from a base station. For example, the UE may receive downlink control information (DCI) from the base station that includes a feedback process field, where a value of the feedback process field indicates at least one of one or more SPS configurations is to be activated. In some examples, the base station may transmit the DCI in a group-common downlink control channel or in a UE-specific downlink control channel. Additionally, the base station may transmit a deactivation message to the UE to indicate for the UE to release one or more activated SPS configurations, where the deactivation message is transmitted in a group-common downlink control channel or a UE-specific downlink control channel.

28 Claims, 19 Drawing Sheets

(51) Int. Cl.
*H04W 72/1273* (2023.01)
*H04W 72/23* (2023.01)

(56) References Cited

U.S. PATENT DOCUMENTS

| | | | |
|---|---|---|---|
| 2021/0051634 A1 | 2/2021 | Fakoorian et al. | |
| 2021/0176031 A1* | 6/2021 | Babaei | H04W 76/30 |
| 2021/0321392 A1* | 10/2021 | Hooli | H04L 5/0053 |
| 2023/0049868 A1* | 2/2023 | Zhou | H04L 5/0098 |
| 2023/0062724 A1* | 3/2023 | Zhou | H04W 72/30 |
| 2023/0156681 A1* | 5/2023 | Tooher | H04W 72/542 |
| | | | 370/329 |

OTHER PUBLICATIONS

Moderator (CMCC): "Summary#1 on Mechanisms to Support Group Scheduling for RRC_Connected UEs for NR MBS", 3GPP TSG RAN WG1 #104-e, 3GPP Draft, R1-2101767, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 26, 2021 (Jan. 26, 2021), 59 Pages, XP051975870, Retrieved from the Internet: URL: https://ftp.3gpp.org/tsg_ran/WG1_RL1/TSGR1_104-e/Docs/R1-2101767.zip, R1-2101767.docx, [retrieved on Jan. 26, 2021] paragraphs [05 .1], [05. 2].

\* cited by examiner

ACTIVATION AND RELEASE FOR GROUP-COMMON DOWNLINK CHANNELS WITH REPETITIONS

FIELD OF TECHNOLOGY

The following relates to wireless communications, including activation and release for group-common downlink channels with repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a base station may communicate with multiple UEs at once. For example, the base station may use broadcasted transmissions or multicasted transmissions to convey a same message to the multiple UEs. Rather than specifically configuring the transmissions for each UE, the base station may configure group-common transmissions for the multiple UEs and indicate these configurations to the multiple UEs to enable the multiple UEs to monitor for and receive these group-common transmissions. Efficient techniques are desired to support group-common transmissions.

SUMMARY

The described techniques relate to improved methods, systems, devices, and apparatuses that support activation and release for group-common downlink channels with repetitions. Generally, the described techniques provide for a user equipment (UE) to activate or release one or more semi-persistent scheduling (SPS) configurations for group-common downlink shared channels (e.g., group-common physical downlink shared channels (PDSCHs)) based on signaling from a base station (e.g., or different scheduling device or network device). For example, after being configured with one or more SPS configurations for respective group-common downlink shared channels, the UE may receive downlink control information (DCI) from the base station that includes a feedback process field (e.g., a hybrid automatic repeat request (HARQ) process number (HPN)), where a value of the feedback process field indicates at least one of the one or more SPS configurations is to be activated. In some examples, the base station may transmit the DCI in a group-common downlink control channel or in a UE-specific downlink control channel. Additionally, the base station may transmit a deactivation message to the UE to indicate for the UE to release one or more activated SPS configurations, where the deactivation message is transmitted in a group-common downlink control channel or a UE-specific downlink control channel. In some examples, the base station may also configure the UE to transmit acknowledgment feedback to acknowledge reception of the DCI for activating one or more SPS configurations, to acknowledge reception of the deactivation message releasing one or more activated SPS configurations, or a combination thereof.

A method for wireless communications at a UE is described. The method may include receiving, from a base station, one or more SPS configurations for respective group-common downlink shared channels, receiving DCI that includes a feedback process field, a value of the feedback process field indicative of at least one SPS configuration of the one or more SPS configurations that is to be activated, and monitoring for the one or more group-common downlink shared channels from the base station based on the value of the feedback process field in the DCI.

An apparatus for wireless communications at a UE is described. The apparatus may include a processor, memory coupled with the processor, and instructions stored in the memory. The instructions may be executable by the processor to cause the apparatus to receive, from a base station, one or more SPS configurations for respective group-common downlink shared channels, receive DCI that includes a feedback process field, a value of the feedback process field indicative of at least one SPS configuration of the one or more SPS configurations that is to be activated, and monitor for the one or more group-common downlink shared channels from the base station based on the value of the feedback process field in the DCI.

Another apparatus for wireless communications at a UE is described. The apparatus may include means for receiving, from a base station, one or more SPS configurations for respective group-common downlink shared channels, means for receiving DCI that includes a feedback process field, a value of the feedback process field indicative of at least one SPS configuration of the one or more SPS configurations that is to be activated, and means for monitoring for the one or more group-common downlink shared channels from the base station based on the value of the feedback process field in the DCI.

A non-transitory computer-readable medium storing code for wireless communications at a UE is described. The code may include instructions executable by a processor to receive, from a base station, one or more SPS configurations for respective group-common downlink shared channels, receive DCI that includes a feedback process field, a value of the feedback process field indicative of at least one SPS configuration of the one or more SPS configurations that is to be activated, and monitor for the one or more group-common downlink shared channels from the base station based on the value of the feedback process field in the DCI.

Some examples of the method, apparatuses, and non-transitory computer-readable medium described herein may further include operations, features, means, or instructions for determining to activate the at least one SPS configuration based on a DCI format of the DCI, the value of the feedback process field in the DCI format, a configuration activation state list message, or a combination thereof.

In some examples of the method, apparatuses, and non-transitory computer-readable medium described herein, receiving the DCI may include operations, features, means, or instructions for receiving a group-common downlink control channel including the DCI.

In some examples of the method, apparatuses, and non-transitory computer-readable medium described herein, the group-common downlink control channel includes an indication to activate monitoring resources configured for at least one or more group-common semi-persistent downlink shared channels.

In some examples of the method, apparatuses, and non-transitory computer-readable medium described herein, receiving the DCI may include operations, features, means, or instructions for receiving a UE-specific downlink control channel configured for the UE including the DCI.

In some examples of the method, apparatuses, and non-transitory computer-readable medium described herein, the UE-specific downlink control channel includes an indication to activate monitoring resources configured for at least one or more UE-specific semi-persistent downlink shared channels, one or more group-common semi-persistent downlink shared channels, or a combination thereof.

Some examples of the method, apparatuses, and non-transitory computer-readable medium described herein may further include operations, features, means, or instructions for receiving, from the base station, a deactivation message including an indication to release the at least one activated SPS configuration and releasing the at least one activated SPS configuration based on receiving the deactivation message.

Some examples of the method, apparatuses, and non-transitory computer-readable medium described herein may further include operations, features, means, or instructions for determining to release the at least one activated SPS configuration based on a common frequency resource, a configuration deactivation state list message, a DCI format of the deactivation message, a feedback process field in the DCI format, or a combination thereof.

In some examples of the method, apparatuses, and non-transitory computer-readable medium described herein, receiving the deactivation message may include operations, features, means, or instructions for receiving a group-common downlink control channel including the deactivation message.

In some examples of the method, apparatuses, and non-transitory computer-readable medium described herein, the deactivation message includes an indication to release monitoring resources configured for at least one or more group-common semi-persistent downlink shared channels.

In some examples of the method, apparatuses, and non-transitory computer-readable medium described herein, receiving the deactivation message may include operations, features, means, or instructions for receiving a UE-specific downlink control channel including the deactivation message.

In some examples of the method, apparatuses, and non-transitory computer-readable medium described herein, the deactivation message includes an indication to release monitoring resources configured for at least one or more UE-specific semi-persistent downlink shared channels, one or more group-common semi-persistent downlink shared channels, or a combination thereof.

Some examples of the method, apparatuses, and non-transitory computer-readable medium described herein may further include operations, features, means, or instructions for transmitting, to the base station, an acknowledgment feedback message to acknowledge release of the at least one activated SPS configuration.

Some examples of the method, apparatuses, and non-transitory computer-readable medium described herein may further include operations, features, means, or instructions for determining a bit location of the acknowledgment feedback message based on a time domain resource allocation (TDRA) table row index received in the DCI, a feedback timing indicator field value received in the deactivation message, or a combination thereof.

In some examples of the method, apparatuses, and non-transitory computer-readable medium described herein, transmitting the acknowledgment feedback message may include operations, features, means, or instructions for transmitting the acknowledgment feedback message including a single bit to acknowledge release of one or more activated SPS configurations for group-common downlink shared channels, to acknowledge release of one or more activated SPS configurations for UE-specific downlink shared channels, or both.

In some examples of the method, apparatuses, and non-transitory computer-readable medium described herein, transmitting the acknowledgment feedback message may include operations, features, means, or instructions for transmitting the acknowledgment feedback message including a first bit to acknowledge release of one or more activated SPS configurations for UE-specific downlink shared channels and a second bit to acknowledge release of one or more activated SPS configurations for group-common downlink shared channels.

Some examples of the method, apparatuses, and non-transitory computer-readable medium described herein may further include operations, features, means, or instructions for receiving, from the base station, a configuration of an acknowledgment feedback mode for transmitting acknowledgment feedback to indicate whether the DCI may be successfully received or not, whether a deactivation message may be successfully received or not, or both.

In some examples of the method, apparatuses, and non-transitory computer-readable medium described herein, the acknowledgment feedback mode includes a positive feedback and negative feedback mode, a negative feedback mode, a no feedback mode, or a combination thereof.

In some examples of the method, apparatuses, and non-transitory computer-readable medium described herein, the configuration of the acknowledgment feedback mode may be different than a configuration for acknowledgment feedback for a group-common downlink shared channel associated with a dynamic grant, for a group-common downlink shared channel associated with a configured grant, for a retransmission of semi-persistent group-common downlink shared channels, or a combination thereof.

In some examples of the method, apparatuses, and non-transitory computer-readable medium described herein, the configuration of the acknowledgment feedback mode may be a positive feedback and negative feedback mode for an activation or deactivation message for semi-persistent group-common downlink shared channels.

A method for wireless communications at a base station is described. The method may include transmitting, to one or more UEs, one or more SPS configurations for respective group-common downlink shared channels, transmitting, to at least a first UE of the one or more UEs, DCI that includes a feedback process field, a value of the feedback process field indicative of at least one SPS configuration of the one or more SPS configurations that is to be activated, and transmitting, to the at least first UE, one or more group-common downlink shared channels according to corresponding numbers of repetitions based on the transmitting the DCI.

An apparatus for wireless communications at a base station is described. The apparatus may include a processor, memory coupled with the processor, and instructions stored in the memory. The instructions may be executable by the processor to cause the apparatus to transmit, to one or more UEs, one or more SPS configurations for respective group-common downlink shared channels, transmit, to at least a first UE of the one or more UEs, DCI that includes a feedback process field, a value of the feedback process field indicative of at least one SPS configuration of the one or more SPS configurations that is to be activated, and transmit, to the at least first UE, one or more group-common downlink shared channels according to corresponding numbers of repetitions based on the transmitting the DCI.

Another apparatus for wireless communications at a base station is described. The apparatus may include means for transmitting, to one or more UEs, one or more SPS configurations for respective group-common downlink shared channels, means for transmitting, to at least a first UE of the one or more UEs, DCI that includes a feedback process field, a value of the feedback process field indicative of at least one SPS configuration of the one or more SPS configurations that is to be activated, and means for transmitting, to the at least first UE, one or more group-common downlink shared channels according to corresponding numbers of repetitions based on the transmitting the DCI.

A non-transitory computer-readable medium storing code for wireless communications at a base station is described. The code may include instructions executable by a processor to transmit, to one or more UEs, one or more SPS configurations for respective group-common downlink shared channels, transmit, to at least a first UE of the one or more UEs, DCI that includes a feedback process field, a value of the feedback process field indicative of at least one SPS configuration of the one or more SPS configurations that is to be activated, and transmit, to the at least first UE, one or more group-common downlink shared channels according to corresponding numbers of repetitions based on the transmitting the DCI.

In some examples of the method, apparatuses, and non-transitory computer-readable medium described herein, transmitting the DCI may include operations, features, means, or instructions for transmitting, via the DCI, an indication for the at least first UE to activate the at least one SPS configuration based on a DCI format of the DCI, the value of the feedback process field in the DCI format, a configuration activation state list message, or a combination thereof.

In some examples of the method, apparatuses, and non-transitory computer-readable medium described herein, transmitting the DCI may include operations, features, means, or instructions for transmitting a group-common downlink control channel including the DCI.

In some examples of the method, apparatuses, and non-transitory computer-readable medium described herein, the group-common downlink control channel includes an indication to activate monitoring resources configured for at least one or more group-common semi-persistent downlink shared channels.

In some examples of the method, apparatuses, and non-transitory computer-readable medium described herein, transmitting the DCI may include operations, features, means, or instructions for transmitting a UE-specific downlink control channel configured for the UE including the DCI.

In some examples of the method, apparatuses, and non-transitory computer-readable medium described herein, the UE-specific downlink control channel includes an indication for the at least first UE to activate monitoring resources configured for at least one or more UE-specific semi-persistent downlink shared channels, one or more group-common semi-persistent downlink shared channels, or a combination thereof.

Some examples of the method, apparatuses, and non-transitory computer-readable medium described herein may further include operations, features, means, or instructions for transmitting, to the at least first UE, a deactivation message including an indication to release the at least one activated SPS configuration.

In some examples of the method, apparatuses, and non-transitory computer-readable medium described herein, the deactivation message indicates for the at least first UE to release the at least one activated SPS configuration based on a configuration deactivation state list message, a DCI format of the deactivation message, a feedback process field in the DCI format, or a combination thereof.

In some examples of the method, apparatuses, and non-transitory computer-readable medium described herein, transmitting the deactivation message may include operations, features, means, or instructions for transmitting a group-common downlink control channel including the deactivation message.

In some examples of the method, apparatuses, and non-transitory computer-readable medium described herein, the deactivation message includes an indication for the at least first UE to release monitoring resources configured for at least one or more group-common semi-persistent downlink shared channels.

In some examples of the method, apparatuses, and non-transitory computer-readable medium described herein, transmitting the deactivation message may include operations, features, means, or instructions for transmitting a UE-specific downlink control channel including the deactivation message.

In some examples of the method, apparatuses, and non-transitory computer-readable medium described herein, the deactivation message includes an indication for the at least first UE to release monitoring resources configured for at least one or more UE-specific semi-persistent downlink shared channels, one or more group-common semi-persistent downlink shared channels, or a combination thereof.

Some examples of the method, apparatuses, and non-transitory computer-readable medium described herein may further include operations, features, means, or instructions for receiving, from the at least first UE, an acknowledgment feedback message to acknowledge release of the at least one activated SPS configuration.

In some examples of the method, apparatuses, and non-transitory computer-readable medium described herein, a bit location of the acknowledgment feedback message may be based on a TDRA table row index received in the DCI, a feedback timing indicator field value received in the deactivation message, or a combination thereof.

In some examples of the method, apparatuses, and non-transitory computer-readable medium described herein, receiving the acknowledgment feedback message may include operations, features, means, or instructions for receiving the acknowledgment feedback message including a single bit to acknowledge release of one or more activated SPS configurations for group-common downlink shared channels, to acknowledge release of one or more activated SPS configurations for UE-specific downlink shared channels, or both.

In some examples of the method, apparatuses, and non-transitory computer-readable medium described herein, receiving the acknowledgment feedback message may include operations, features, means, or instructions for receiving the acknowledgment feedback message including a first bit to acknowledge release of one or more activated SPS configurations for UE-specific downlink shared channels and a second bit to acknowledge release of one or more activated SPS configurations for group-common downlink shared channels.

Some examples of the method, apparatuses, and non-transitory computer-readable medium described herein may further include operations, features, means, or instructions for transmitting, to the at least first UE, a configuration of an acknowledgment feedback mode for transmitting acknowledgment feedback to indicate whether the DCI may be successfully received or not, whether a deactivation message may be successfully received or not, or both.

In some examples of the method, apparatuses, and non-transitory computer-readable medium described herein, the acknowledgment feedback mode includes a positive feedback and negative feedback mode, a negative feedback mode, a no feedback mode, or a combination thereof.

In some examples of the method, apparatuses, and non-transitory computer-readable medium described herein, the configuration of the acknowledgment feedback mode may be different than a configuration for acknowledgment feedback for a group-common downlink shared channel associated with a dynamic grant, for a group-common downlink shared channel associated with a configured grant, for a retransmission of semi-persistent group-common downlink shared channels, or a combination thereof.

In some examples of the method, apparatuses, and non-transitory computer-readable medium described herein, the configuration of the acknowledgment feedback mode may be a positive feedback and negative feedback mode for an activation or deactivation message for semi-persistent group-common downlink shared channels.

DETAILED DESCRIPTION

Figure 1:
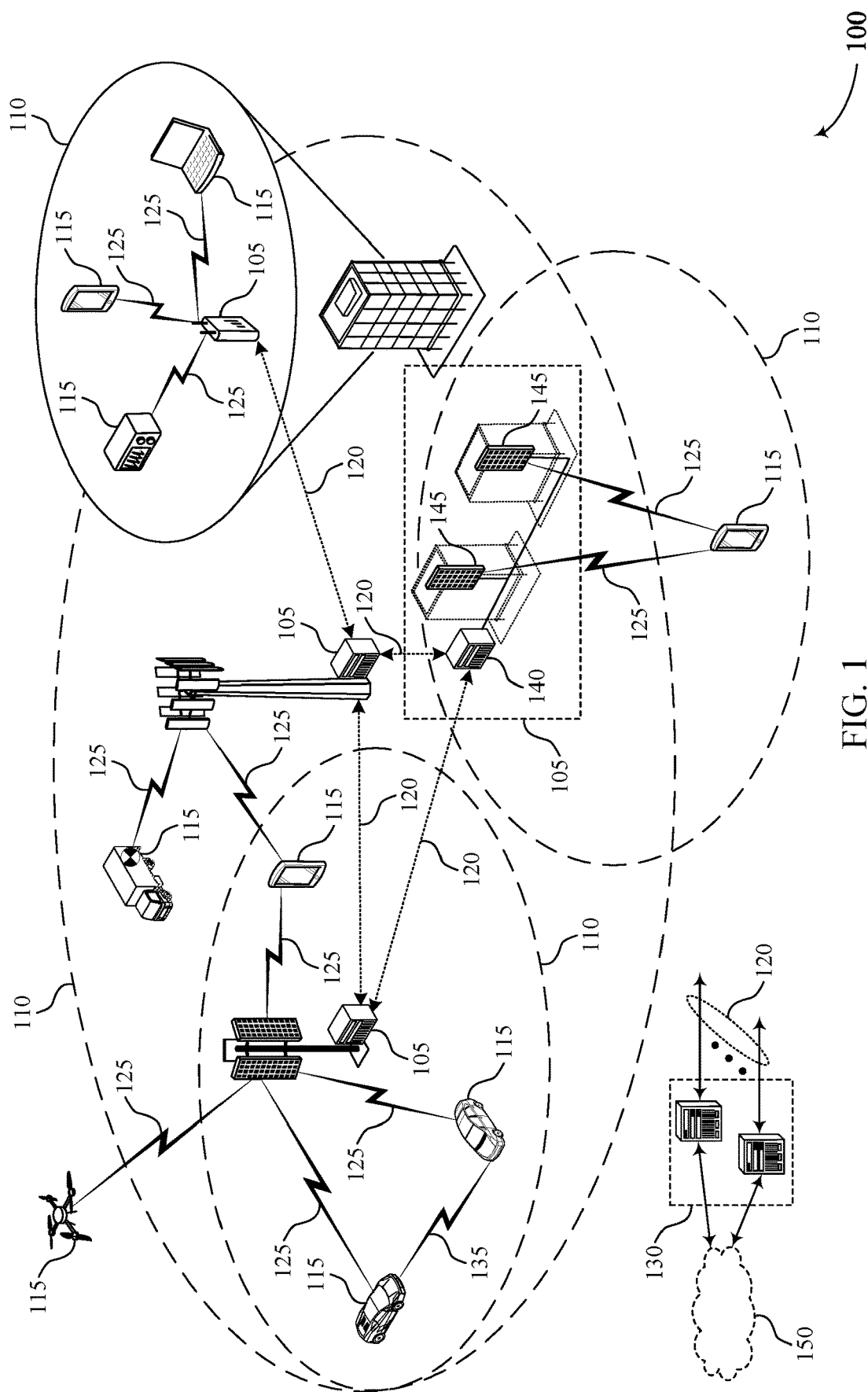
FIG. 1 illustrates an example of a wireless communications system that supports activation and release for group-common downlink channels with repetitions in accordance with aspects of the present disclosure.

A user equipment (UE) and a base station may support semi-persistent scheduling (SPS) configurations for physical downlink shared channel (PDSCH) signaling using unicast and multicast/broadcast communications. In some cases, the base station may utilize a physical downlink control channel (PDCCH) (e.g., based on a downlink control information (DCI) format) to configure the UE to operate according to one or more SPS configurations. Additionally, the base station may indicate to the UE to activate one SPS configuration (e.g., separate activation) at a time and/or to release one or more SPS configurations (e.g., separate or joint deactivation). For example, the base station may configure the UE to release multiple SPS configurations separately (e.g., using multiple DCIs) or jointly (e.g., using a single DCI), but the base station may configure the UE to activate an individual SPS configuration (e.g., to activate multiple SPS configurations, the base station may transmit a separate DCI for each of the multiple SPS configurations). However, group-common (e.g., multicast) activation and release of SPS for PDSCH signaling has yet to be defined. As a result, the base station may be unable to accurately and efficiently configure one or more UEs within a same multicast/broadcast services (MBS) group to activate or release SPS PDSCH signaling.

As described herein, a base station may configure a UE to activate or release one or more SPS configurations for group-common (e.g., multicast) PDSCH signaling and/or UE-specific (e.g., unicast) PDSCH signaling. In some cases, the base station may configure one or more UEs to activate or release one or more SPS configurations for group-common (e.g., multicast) PDSCH signaling via group-common PDCCH signaling. For example, the base station may indicate which SPS configurations to activate or release based on a DCI format of the group-common PDCCH, a hybrid automatic repeat request (HARQ) process number (HPN) field in the DCI format of the group-common PDCCH, an activation state list, a common frequency resource, or a combination thereof. Additionally or alternatively, the base station may configure a specific UE to activate or release one or more SPS configurations for group-common PDSCH signaling via UE-specific (e.g., unicast) PDCCH signaling. For example, the base station may indicate which SPS configurations to activate or deactivate based on an HPN field in a DCI format of the UE-specific PDCCH.

In some examples, the UE may transmit an acknowledgment feedback message to the base station to indicate that an activation or deactivation (e.g., via the group-common or UE-specific PDCCH) of one or more SPS configurations for group-common PDSCH signaling was received or not, where a bit location of the acknowledgment feedback message is based on whether a single or multiple SPS configurations are separately or jointly released. Additionally, the base station may configure the UE to use a SPS group-common PDSCH HARQ acknowledgment feedback mode to acknowledge whether an activation or deactivation message was successfully received or not. The HARQ acknowledgment feedback mode for SPS group-common PDSCH signaling may be different from a feedback mode used for dynamic group-common PDSCH signaling.

Aspects of the disclosure are initially described in the context of wireless communications systems. Additionally, aspects of the disclosure are illustrated through an additional wireless communications system, an acknowledgment feedback configuration, and a process flow. Aspects of the disclosure are further illustrated by and described with reference to apparatus diagrams, system diagrams, and flowcharts that relate to activation and release for group-common downlink channels with repetitions.

FIG. 1 illustrates an example of a wireless communications system 100 that supports activation and release for group-common downlink channels with repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix (CP). A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the CP prepended to each symbol period). In some wireless communications systems 100, a slot may further be divided into multiple mini-slots containing one or more symbols. Excluding the CP, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may communicate with multiple UEs 115 at once. For example, the base station 105 may use broadcasted transmissions or multicasted transmissions to convey a same message to the multiple UEs 115. Rather than specifically configuring the transmissions for each UE 115, the base station 105 may configure group-common transmissions for the multiple UEs 115 and may indicate these configurations to the multiple UEs 115 to enable the multiple UEs 115 to monitor for and receive these group-common transmissions. To support multicast communications and group-common transmissions, the base station 105 may use a common frequency resource. The base station 105 may use the common frequency resource for multicasting transmissions to UEs 115 in a connected state with the base station 105 (e.g., RRC-CONNECTED UEs). Additionally, the common frequency resource may be confined within a frequency resource of a dedicated unicast BWP and may use a same numerology (e.g., subcarrier spacing (SCS) and CP) as the BWP.

In some examples, the common frequency resource used for the multicast communications may include different configuration information (e.g., signaled to UEs 115 subscribed to receive the multicast communications). For example, the common frequency resource may be configured with a starting physical resource block (PRB) and a number of PRBs. Additionally, the common frequency resource may be used for a PDSCH configuration for MBS (e.g., separate from a PDSCH configuration of the dedicated unicast BWP), a PDCCH configuration for MBS (e.g., separate from the PDCCH-Config of the dedicated unicast BWP), one or more SPS configurations for MBS (e.g., separate from the SPS configurations of the dedicated unicast BWP), or a combination thereof.

As part of the one or more SPS configurations for MBS, the base station 105 may transmit SPS group-common PDSCHs via the multicast communications. For connected state UEs 115 (e.g., RRC_CONNECTED UEs), more than one SPS group-common PDSCH configuration for MBS may be configured per UE 115 subject to UE capability. In some examples, a total number of SPS configurations supported by a UE 115 for unicast may not be increased due to additionally supporting MBS. Additionally, the connected state UEs 115 may support HARQ acknowledgment feedback for SPS group-common PDSCHs for MBS. For activation or deactivation of SPS group-common PDSCH for MBS in the connected state (e.g., RRC_CONNECTED state), the connected state UEs 115 may at least support group-common PDCCHs.

For activation or release of unicast SPS PDSCHs, UEs 115 may support separate activation of an SPS configuration for a given BWP of a serving cell in a single DCI. Additionally, the UEs 115 may also support separate and joint release of one or more SPS configurations for a given BWP of a serving cell in a single DCI. In some examples, an HPN bit field in a release DCI may be used to indicate which SPS index(es) is (are) released. For example, a table of states may be configured by a base station 105 (e.g., via sps-ConfigDeactivationStateList), where each state can be mapped to a single or multiple configured grant configuration indices to be released. If the table of states is not configured, separate release may be used.

For example, if a UE 115 is provided more than one configuration for an uplink grant physical uplink shared channel (PUSCH) (e.g., Type 2 PUSCH) or for SPS PDSCH, a value of the HPN field in a DCI format may indicate an activation for a corresponding uplink grant PUSCH or for an SPS PDSCH configuration with a same value as provided by a configuration index for the uplink grant PUSCHs (e.g., ConfiguredGrantConfigIndex) or by a configuration index for the SPS PDSCH configurations (e.g., sps-ConfigIndex), respectively. Validation of the DCI format may be achieved if a redundancy version (RV) field for the DCI format is set as in a table preconfigured for the UEs 115.

That is, if a UE 115 is provided more than one configuration for uplink grant PUSCHs or for SPS PDSCHs and if the UE 115 is provided with respective state lists (e.g., ConfiguredGrantConfigType2DeactivationStateList or sps-ConfigDeactivationStateList), a value of the HPN field in a DCI format may indicate a corresponding entry for scheduling release of one or more uplink grant PUSCHs or SPS PDSCH configurations. Additionally or alternatively, if a UE 115 is provided more than one configuration for uplink grant PUSCHs or for SPS PDSCHs and if the UE is not provided with the respective state lists (e.g., ConfiguredGrantConfigType2DeactivationStateList or sps-ConfigDeactivationStateList), a value of the HPN field in a DCI format may indicate a release for a corresponding uplink grant PUSCH or for a SPS PDSCH configuration with a same value as provided by configuration indexes for either type of transmission (e.g., ConfiguredGrantConfigIndex or by sps-ConfigIndex, respectively). Table 1 below shows an example of a mapping between state indexes of the HPN field (e.g., value of the HPN field) and SPS configuration indexes.

TABLE 1

State Index Mapping to SPS Configurations

| State Index | SPS Configuration Index for SPS PDSCH |
|---|---|
| 0 | 1, 3 |
| 1 | 0, 2 |
| 2 | 4 |

In some examples, the UEs 115 may support HARQ acknowledgment (HARQ-ACK) feedback for unicast SPS PDSCH release. For example, to generate a HARQ acknowledgment bit for SPS release, for both type-1 and type-2 HARQ-ACK codebook construction, one HARQ-ACK bit may be generated for SPS PDSCH release with a joint release DCI. Additionally, the HARQ-ACK bit location for SPS PDSCH release with a separate release DCI may be derived based on a time-domain resource allocation (TDRA) table row index indicated in an activation DCI and a time delay (e.g., K1) indicated in the release DCI. In some examples, the HARQ-ACK bit location for SPS PDSCH release with a joint release DCI may be derived based on the TDRA table row index indicated in the activation DCI for SPS PDSCH with the lowest SPS configuration index among the jointly released configurations and K1 indicated in the release DCI. When the SPS configurations are released by a joint release DCI, multiple SPS configurations to be released by the joint release DCI should have a same priority. However, signaling of activation/release by a group-common PDCCH or a UE-specific PDCCH for SPS group-common PDSCHs has yet to be defined.

Wireless communications system 100 may support efficient techniques for a UE 115 to activate or release one or more SPS configurations for group-common PDSCHs based on signaling from a base station 105. For example, after being configured with one or more SPS configurations for respective group-common PDSCHs, the UE 115 may receive a DCI from the base station 105 that includes a feedback process field (e.g., an HPN), where a value of the feedback process field indicates at least one of the one or more SPS configurations is to be activated. In some examples, the base station 105 may transmit the DCI in a group-common PDCCH or in a UE-specific PDCCH. Additionally, the base station 105 may transmit a deactivation message to the UE 115 to indicate for the UE 115 to release one or more activated SPS configurations, where the deactivation message is also transmitted in a group-common PDCCH or a UE-specific PDCCH. In some examples, the base station 105 may also configure the UE 115 to transmit acknowledgment feedback (e.g., HARQ-ACK feedback) to acknowledge reception of the DCI for activating one or more SPS configurations, to acknowledge reception of the deactivation message releasing one or more activated SPS configurations, or a combination thereof.

Figure 2:
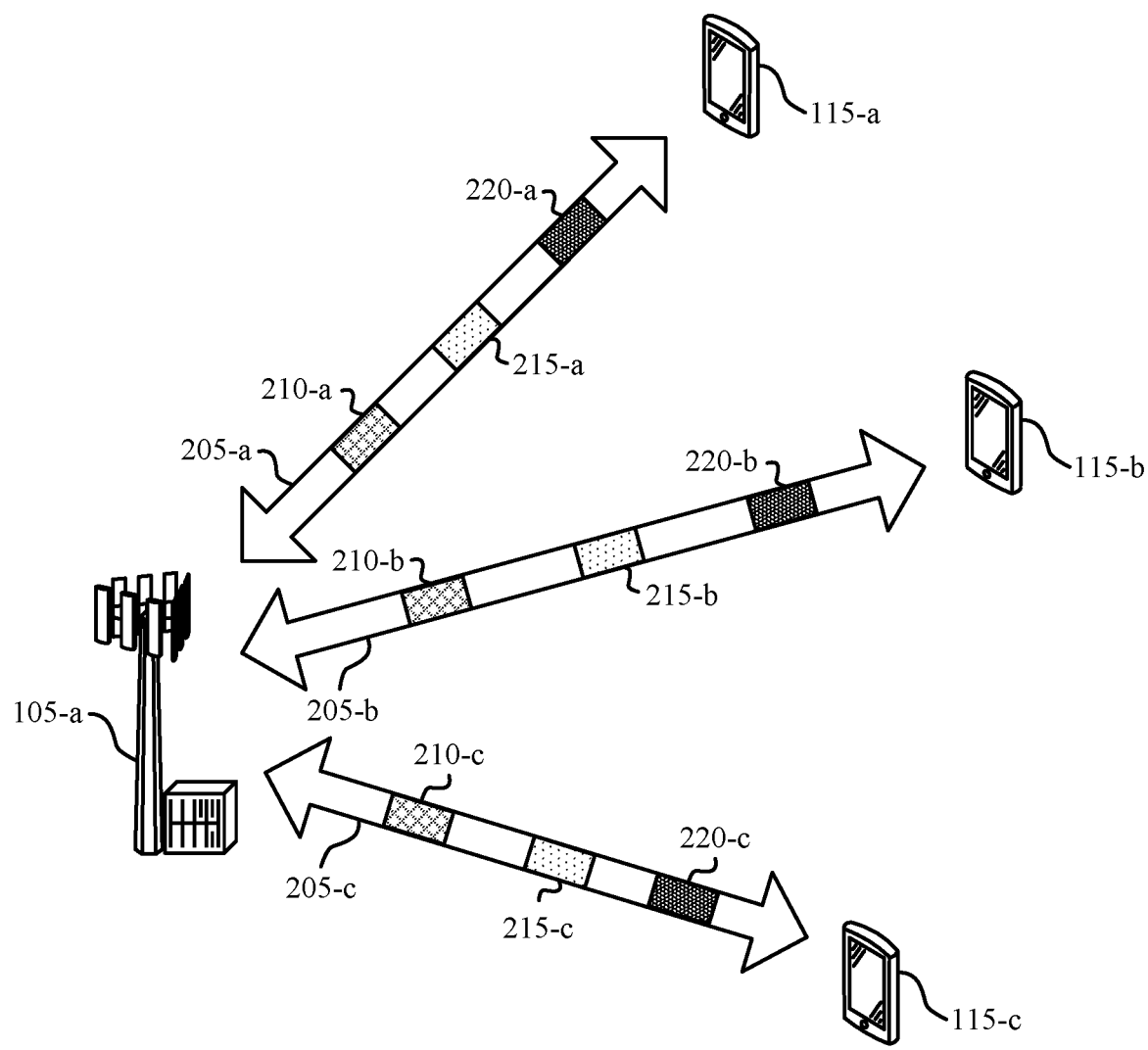
FIG. 2 illustrates an example of a wireless communications system that supports activation and release for group-common downlink channels with repetitions in accordance with aspects of the present disclosure.

FIG. 2 illustrates an example of a wireless communications system 200 that supports activation and release for group-common downlink channels with repetitions in accordance with aspects of the present disclosure. In some examples, wireless communications system 200 may implement aspects of or may be implemented by aspects of wireless communications system 100. For example, wireless communications system 200 may include a base station 105-a, a UE 115-a, a UE 115-b, and a UE 115-c, which may be examples of base stations 105 and UEs 115, respectively, as described with reference to FIG. 1.

Additionally, the UEs 115 may be subscribed to an MBS group to receive multicast or broadcast communications from base station 105-a. In some cases, base station 105-a may communicate control signaling, data, or both with a UE 115 via a communication link 205 (e.g., for the multicast communications), and each UE 115 may communicate control signaling, data, or both with base station 105-a via the corresponding communication link 205. For example, UE 115-a may communicate with base station 105-a via a communication link 205-a, UE 115-b may communicate with base station 105-a via a communication link 205-b, and UE 115-c may communicate with base station 105-a via a communication link 205-c. Base station 105-a may communicate with each UE 115 via broadcast services (e.g., a single message broadcasted out such that any UE 115 subscribed to the MBS group can receive it) or via multicast services (e.g., respective messages transmitted to each UE 115 subscribed to the MBS group).

As described herein, wireless communications system 200 may support activation and release for SPS group-common (e.g., multicast) PDSCH signaling by group-common PDCCH or UE-specific PDCCH. For example, base station 105-a may transmit an activation message 210 or release message 215 for SPS group-common PDSCH signaling configurations to one or multiple UEs 115 via a group-common PDCCH. In some cases, a wireless communication system 200 may support separate activation by using group-common PDCCH signaling for SPS group-common PDSCH signaling. For example, base station 105-a may separately activate multiple SPS configurations using multiple group-common PDCCH transmissions. In some cases, base station 105-a may provide a single configuration for SPS group-common PDSCH signaling and, and a corresponding UE 115 may validate that a DCI format of group-common PDCCH signaling if all fields for the DCI format are set to specific values (e.g., given by a predefined or preconfigured table).

Additionally or alternatively, if a UE 115 is provided multiple configurations for SPS group-common PDSCH signaling, a value of an HPN field in a DCI format of a group-common PDCCH may indicate an activation for an SPS group-common PDSCH configuration where a value may map to an SPS configuration index (e.g., sps-ConfigIndex) for SPS group-common PDSCH. For example, an HPN in a group-common PDCCH transmission may correspond to a SPS configuration index for SPS group-common PDSCH. That is, an HPN={0, 1, 2} in a group-common PDCCH may correspond to respective configuration indexes for the SPS configurations (e.g., maps to sps-ConfigIndex_MBS={0, 1, 2} for SPS group-common PDSCH) in the common frequency resource. Additionally or alternatively, base station 105-a may configure an activation state list (e.g., sps-ConfigActivationStateList) to the UEs 115 to jointly activate multiple SPS group-common PDSCH configurations in the common frequency resource. Table 2 below shows an example of a mapping between state indexes (e.g., values of HPN field) to corresponding SPS configuration indexes. In some examples, multiple SPS group-common PDSCH(s) configurations to be activated by the joint activation DCI should have a same priority.

TABLE 2

Mapping Between State Indexes and SPS Configuration Indexes

| State Index | SPS Configuration Index for SPS Group-Common PDSCH |
|---|---|
| 0 | 2, 4 |
| 1 | 1 |

In some examples, wireless communications system 200 may support separate and joint release for SPS group-common PDSCH signaling by group-common PDCCH signaling. For example, base station 105-a may transmit a release message 215 for SPS group-common PDSCH signaling configurations to one or multiple UEs 115 via a group-common PDCCH.

The release message 215 may release one or multiple SPS group-common PDSCH configurations. In some cases, base station 105-a may configure a deactivation state list (e.g., sps-ConfigDeactivationStateList) for SPS configurations for a MBS SPS group-common PDSCH in a common frequency resource, separately from unicast SPS configurations. For example, SPS configurations for group-common PDCCH signaling may be released separately if a UE 115 is provided with multiple configurations for SPS group-common PDSCH for MBS. In some cases, if a UE 115 is provided with a deactivation state index list (e.g., sps-ConfigDeactivationStateList) for SPS group-common PDSCH, a value of the HPN field in a DCI format of group-common PDCCH may indicate a corresponding entry for scheduling release of one or more SPS group-common PDSCH configurations. Tables 3 and 4 below show examples of mappings between state indexes (e.g., values of HPN field) to corresponding SPS configuration indexes for group-common PDSCHs and multiple unicast PDSCHs, respectively. Additionally or alternatively, if a UE 115 is not provided with a deactivation state index for MBS SPS group-common PDSCH, a value of the HPN field in a DCI format may indicate a release for a corresponding SPS group-common PDSCH configuration with a value mapping to the SPS configuration index for SPS group-common PDSCH. In some cases, multiple SPS group-common PDSCH signaling configurations released by the joint release DCI may have a same priority.

TABLE 3

Mapping Between State Indexes and SPS Configuration Indexes for Group-Common PDSCHs

| State Index | SPS Configuration Index for SPS Group-Common PDSCH |
|---|---|
| 0 | 0, 2 |
| 1 | 1 |

TABLE 4

Mapping Between State Indexes and SPS
Configuration Indexes for SPS PDSCHs

| State Index | SPS Configuration Index for SPS PDSCH |
|---|---|
| 0 | 1, 3 |
| 1 | 0, 2 |
| 2 | 4 |

Additionally, the UEs 115 may support acknowledgment/negative acknowledgment (ACK/NACK) feedback for SPS group-common PDSCH release by a group-common PDCCH using acknowledgment feedback 220. For the ACK/NACK feedback, the UE 115 may construct a HARQ-ACK codebook with a joint release DCI of a group-common PDCCH based on one HARQ ACK/NACK bit generated for SPS GC-PDSCH release. Additionally or alternatively, the UE 115 may determine a HARQ-ACK bit location with a separate release DCI of a group-common PDCCH. For example, for SPS group-common PDSCH release with a separate release DCI of the group-common PDCCH, the HARQ-ACK bit location may be derived based on a MBS TDRA table row index indicated in the activation DCI of the group-common PDCCH and a time delay (e.g., K1) indicated in the release DCI of the group-common PDCCH. In some examples, the MBS TDRA table may be configured in a PDSCH configuration message (e.g., pdsch-Config) for MBS in a common frequency resource. Additionally or alternatively, the UE 115 may determine a HARQ-ACK bit location with a joint release DCI of the group-common PDCCH. For example, for an SPS GC-PDSCH release with a joint release DCI of GC-PDCCH, the HARQ-ACK bit location may be derived based on a MBS TDRA table row index indicated in the activation DCI of the group-common PDCCH with a lowest SPS configuration index among the jointly released SPS configurations and a time delay (K1) indicated in the release DCI of the group-common PDCCH.

In some examples, rather than using a group-common PDCCH for activation and/or release of SPS group-common PDSCHs, base station 105-a may signal activation and/or release for SPS group-common PDSCHs by a UE-specific PDCCH. For example, the UEs 115 may support separate or joint activation by using UE-specific PDCCH for SPS group-common PDSCHs. For example, an activation state list (e.g., sps-ConfigActivationStateList) configured in a dedicated BWP may include one or more MBS SPS group-common PDSCH configurations. As such, if the UE 115 is provided the activation state list (e.g., sps-ConfigActivationStateList) including SPS PDSCH and/or SPS GC-PDSCH, a value of the HPN field in a DCI format of UE-specific PDCCH may indicate an entry for scheduling activation of one or more SPS PDSCH and/or SPS group-common PDSCH configurations.

Additionally or alternatively, if the UEs 115 are not configured with the activation state list, a value of the HPN field in a DCI format indicates an activation for a corresponding SPS PDSCH or SPS GC-PDSCH configuration. For example, if a UE 115 is provided one or more configurations for SPS group-common PDSCHs, a value of an HPN field in a DCI format of the UE-specific PDCCH may indicate an activation for an SPS group-common PDSCH configuration with a value mapping to configuration indexes (e.g., sps-ConfigIndex_MBS) for the SPS group-common PDSCHs. For example, values of the HPN={0, . . . , 4} in the UE-specific PDCCH may correspond to respective SPS configuration indexes (e.g., to sps-ConfigIndex={0, . . . , 4} for SPS PDSCH, and additional values of the HPN={5, 6, 7} in the UE-specific PDCCH may correspond to additional SPS configuration indexes for MBS (e.g., to sps-ConfigIndex_MBS={0, 1, 2} for SPS group-common PDSCH), where the additional SPS configuration indexes for MBS are configured by unicast RRC. In some examples, multiple SPS PDSCH(s) and SPS group-common PDSCH(s) configurations to be activated by the joint activation DCI should have a same priority.

Additionally, the UEs 115 may support separate and joint release by using UE-specific PDCCHs for SPS group-common PDSCHs. For example, a deactivation state list (e.g., sps-ConfigDeactivationStateList) configured in a dedicated BWP may include one or more MBS SPS group-common PDSCH configurations. As such, if the UE 115 is provided the deactivation state list (e.g., sps-ConfigDeactivationStateList) including SPS PDSCH and/or SPS GC-PDSCH, a value of the HPN field in a DCI format of UE-specific PDCCH may indicate an entry for scheduling release of one or more SPS PDSCH and/or SPS group-common PDSCH configurations. Table 5 below shows an example of a mapping between state indexes (e.g., HPN field values) to corresponding SPS configuration indexes for group-common PDSCHs and other unicast PDSCHs.

TABLE 5

Mapping Between State Indexes and SPS Configuration
Indexes for Group-Common PDSCHs and PDSCHs

| State Index | SPS Configuration Index for SPS PDSCH/SPS Group-Common PDSCH |
|---|---|
| 0 | 1, 3 for SPS PDSCH |
| 1 | 0, 2 for SPS PDSCH |
| 2 | 4 for SPS PDSCH |
| 3 | 0, 2 for SPS Group-Common PDSCH |
| 4 | 1 for SPS Group-Common PDSCH |
| 5 | 4 for SPS PDSCH<br>0, 2 for SPS Group-Common PDSCH |

Additionally or alternatively, if the UEs 115 are not configured with the deactivation state list, a value of the HPN field in a DCI format indicates a release for a corresponding SPS PDSCH or SPS GC-PDSCH configuration. For example, similar to the separate activation described previously, a value of HPN={5, 6, 7} in a UE-specific PDCCH may correspond to a given SPS configuration index for MBS (e.g., to sps-ConfigIndex_MBS={0, 1, 2} for SPS group-common PDSCH), where the mapping and/or SPS configuration indexes for MBS are configured by unicast RRC. In some examples, multiple SPS PDSCH(s) and SPS group-common PDSCH(s) configurations to be released by the joint release DCI should have a same priority.

In some examples, the UEs 115 may support ACK/NACK feedback for SPS group-common PDSCH release by UE-specific PDCCH. For example, the UEs 115 may support a HARQ-ACK codebook construction with a joint release DCI of UE-specific PDCCH based on a one-bit HARQ-ACK that is generated for SPS PDSCH release and/or SPS GC-PDSCH release. Additionally or alternatively, the UEs 115 may support a HARQ-ACK codebook construction with a joint release DCI of UE-specific PDCCH based on separate one-bit HARQ-ACKs generated for SPS PDSCH release and SPS GC-PDSCH release, respectively, where the separate HARQ-ACKs are concatenated in a predefined order (e.g., one-bit for SPS PDSCH and then one-bit for SPS GC-PDSCH). Additionally or alternatively, the UEs 115 may determine a HARQ-ACK bit location with a separate release DCI of a UE-specific PDCCH for ACK/NACK feedback for SPS group-common PDSCH release by the UE-specific PDCCH. For example, a HARQ-ACK bit location may be derived based on a TDRA table row index indicated in the activation DCI and a time delay (K1) indicated in the release DCI of the UE-specific PDCCH (e.g., activation DCI can be group-common PDCCH or UE-specific PDCCH).

Additionally or alternatively, the UEs 115 may determine a HARQ-ACK bit location with a joint release DCI of a UE-specific PDCCH for ACK/NACK feedback for SPS group-common PDSCH release by the UE-specific PDCCH. For example, for SPS PDSCH and/or group-common PDSCH release with a joint release DCI of the UE-specific PDCCH, the HARQ-ACK bit location may be derived based on a TDRA table row index indicated in the activation DCI with a lowest SPS configuration index among the jointly released configurations and a time delay (K1) indicated in the release DCI. For example, sps-ConfigIndex={0, . . . , 4} may be mapped to corresponding configuration indexes for SPS PDSCH, and sps-ConfigIndex_MBS={0, 1, 2} for SPS group-common PDSCH may be mapped to sps-ConfigIndex={5, 6, 7} (e.g., configured by unicast RRC). Table 6 below shows an example of a mapping between a state index to a corresponding SPS PDSCH and SPS group-common PDSCHs, where the HARQ-ACK bit location may be determined based in part on the SPS configuration index=4 for the SPS PDSCH because the 4 is the lowest SPS configuration index.

TABLE 6

Mapping Between State Indexes and SPS Configuration Indexes for Group-Common PDSCHs and PDSCHs

| State Index | SPS Configuration Index for SPS PDSCH/SPS Group-Common PDSCH |
| --- | --- |
| — | — |
| 5 | 4 for SPS PDSCH |
|  | 0, 2 for SPS Group-Common PDSCH |

In some examples, the UEs 115 may support a feedback selection for SPS group-common PDSCH activation/release. For multicast reception, the UEs 115 may be configured to use one of the HARQ-ACK feedback mode: HARQ-ACK ACK/NACK feedback, HARQ-ACK NACK-only feedback; and no HARQ-ACK feedback. For multicast group-common PDSCHs, the HARQ-ACK feedback mode configured for SPS group-common PDSCHs may be different than that of dynamic group-common PDSCHs. Additionally, for SPS group-common PDSCH activation/release, the HARQ-ACK feedback may be different than that of SPS group-common PDSCH configured grant or SPS group-common PDSCH retransmission. For example, if a UE 115 is configured with HARQ-ACK NACK-only feedback or no HARQ-ACK feedback for SPS group-common PDSCHs, the SPS release validation may be an exception, where the UE 115 will send an ACK if SPS release based on group-common PDCCH or UE-specific PDCCH is detected successfully.

Figure 3:
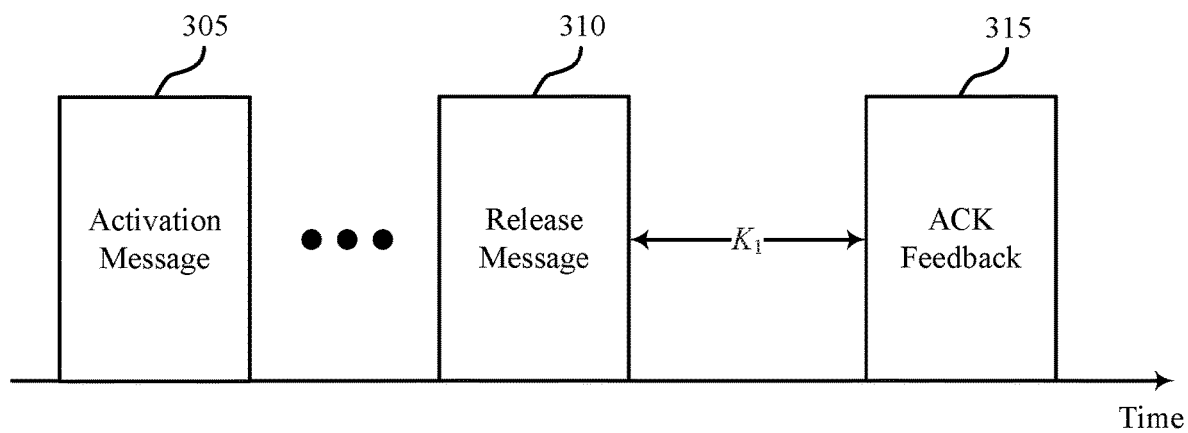
FIG. 3 illustrates an example of an acknowledgment feedback configuration that supports activation and release for group-common downlink channels with repetitions in accordance with aspects of the present disclosure.

FIG. 3 illustrates an example of an acknowledgment feedback configuration 300 that supports activation and release for group-common downlink channels with repetitions in accordance with aspects of the present disclosure. Acknowledgment feedback configuration 300 may implement aspects of or may be implemented by aspects of wireless communications system 100, wireless communications system 200, or both. For example, a UE 115 may use acknowledgment feedback configuration 300 to transmit HARQ-ACK feedback to acknowledge whether a release message for one or more SPS configurations is successfully received and decoded or not.

As described herein, the UE 115 may be configured with one or more SPS group-common PDSCH configurations. Accordingly, a base station 105 may activate at least one of the one or more SPS group-common PDSCH configurations using an activation message 305. For example, activation message 305 may be a DCI transmitted by the base station 105 in a group-common PDCCH or a UE-specific PDCCH, where the UE 115 determines which SPS group-common PDSCH configurations (and/or other SPS PDSCHs) to activate based on an HPN field value in the DCI. Subsequently, once the SPS group-common PDSCH configurations are no longer being used, the base station 105 may then transmit a release message 310 to the UE 115, where release message 310 may also be a DCI transmitted by the base station 105 in a group-common PDCCH or a UE-specific PDCCH (e.g., based on an HPN field value in the DCI to indicate which SPS group-common PDSCH or SPS PDSCH configurations to release).

In some examples, the UE 115 may transmit acknowledgment feedback 315 to indicate that release message 310 is successfully received. For example, the base station 105 may configure the UE 115 to transmit acknowledgment feedback 315 according to different modes as described with reference to FIG. 2. A first mode (e.g., HARQ-ACK ACK/NACK feedback) may include the UE 115 transmitting an ACK if release message 310 is successfully received or a NACK if release message 310 is not successfully received. A second mode (e.g., HARQ-ACK NACK-only feedback) may include the UE 115 transmitting a NACK if release message 310 is not successfully received and refraining from transmitting any feedback if release message 310 is successfully received. A third mode (e.g., no HARQ-ACK feedback) may include the UE 115 refraining from transmitting acknowledgment feedback 315.

To determine when and where to transmit acknowledgment feedback 315, the UE 115 may use information from activation message 305 and information from release message 310. For example, the UE 115 may transmit acknowledgment feedback 315 based on a TDRA table row index indicated in activation message 305 (e.g., with a lowest SPS configuration index among the jointly released configurations if applicable) and a time delay (K1) indicated in release message 310 (e.g., activation DCI can be group-common PDCCH or UE-specific PDCCH).

Figure 4:
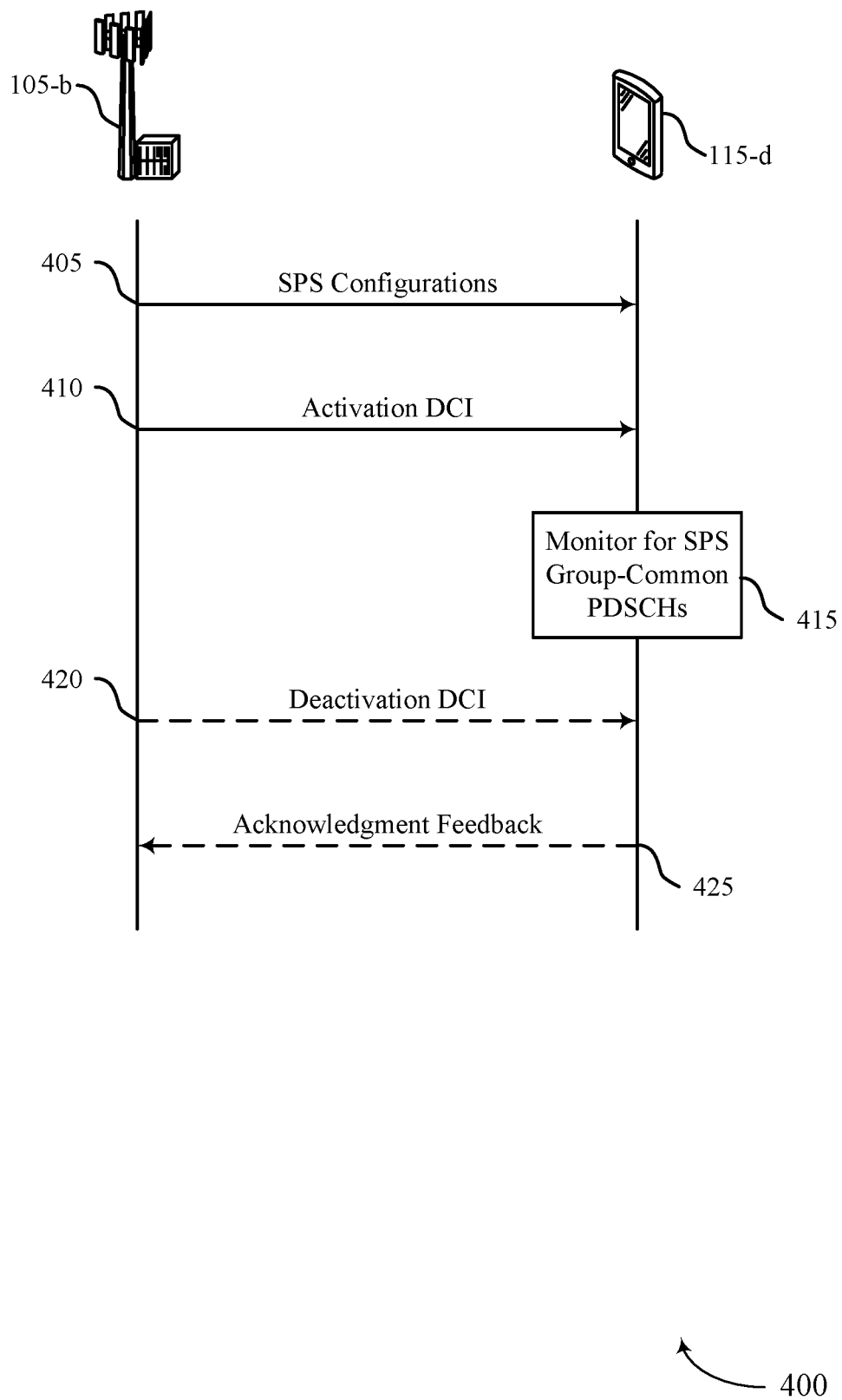
FIG. 4 illustrates an example of a process flow that supports activation and release for group-common downlink channels with repetitions in accordance with aspects of the present disclosure.

FIG. 4 illustrates an example of a process flow 400 that supports activation and release for group-common downlink channels with repetitions in accordance with aspects of the present disclosure. In some examples, process flow 400 may implement aspects of or may be implemented by aspects of wireless communications system 100, wireless communications system 200, or both. For example, process flow 400 may include a base station 105-b and a UE 115-d, which may represent examples of corresponding base stations 105 and UEs 115, respectively, as described with reference to FIGS. 1-3.

In the following description of process flow 400, the operations between UE 115-d and base station 105-b may be performed in different orders or at different times. Certain operations may also be left out of process flow 400, or other operations may be added to process flow 400. It is to be understood that while UE 115-d and base station 105-b are shown performing a number of the operations of process flow 400, any wireless device may perform the operations shown.

At 405, UE 115-d may receive, from base station 105-b, one or more SPS configurations for respective group-common downlink shared channels (e.g., SPS group-common PDSCHs).

At 410, UE 115-d may receive DCI that includes a feedback process field (e.g., HPN field), a value of the feedback process field indicative of at least one SPS configuration of the one or more SPS configurations that is to be activated. For example, UE 115-d may determine to activate the at least one SPS configuration based on a DCI format of the DCI, the value of the feedback process field in the DCI format, a configuration activation state list message, or a combination thereof. In some examples, UE 115-d may receive a group-common downlink control channel including the DCI, where the group-common downlink control channel includes an indication to activate monitoring resources configured for at least one or more group-common semi-persistent downlink shared channels. Additionally or alternatively, UE 115-d may receive a UE-specific downlink control channel configured for UE 115-d including the DCI, where the UE-specific downlink control channel includes an indication to activate monitoring resources configured for at least one or more UE-specific semi-persistent downlink shared channels, one or more group-common semi-persistent downlink shared channels, or a combination thereof.

At 415, UE 115-d may monitor for the one or more group-common downlink shared channels from the base station based on the value of the feedback process field in the DCI.

At 420, UE 115-d may receive, from base station 105-b, a deactivation message including an indication to release the at least one activated SPS configuration. Accordingly, UE 115-d may release the at least one activated SPS configuration based on receiving the deactivation message. For example, UE 115-d may determine to release the at least one activated SPS configuration based on a common frequency resource, a configuration deactivation state list message, a DCI format of the deactivation message, a feedback process field in the DCI format, or a combination thereof.

In some examples, UE 115-d may receive a group-common downlink control channel including the deactivation message, where the deactivation message includes an indication to release monitoring resources configured for at least one or more group-common semi-persistent downlink shared channels. Additionally or alternatively, UE 115-d may receive a UE-specific downlink control channel including the deactivation message, where the deactivation message includes an indication to release monitoring resources configured for at least one or more UE-specific semi-persistent downlink shared channels, one or more group-common semi-persistent downlink shared channels, or a combination thereof.

At 425, UE 115-d may transmit acknowledgment feedback to indicate whether the activation DCI and/or the deactivation DCI are successfully received or not. For example, UE 115-d may receive, from base station 105-b, a configuration of an acknowledgment feedback mode for transmitting acknowledgment feedback to indicate whether the DCI is successfully received or not, whether a deactivation message is successfully received or not, or both. In some examples, the acknowledgment feedback mode may include a positive feedback and negative feedback mode, a negative feedback mode, a no feedback mode, or a combination thereof. Additionally, the configuration of the acknowledgment feedback mode may be different than a configuration for acknowledgment feedback for a group-common downlink shared channel associated with a dynamic grant, for a group-common downlink shared channel associated with a configured grant, for a retransmission of semi-persistent group-common downlink shared channels, or a combination thereof. In some examples, the configuration of the acknowledgment feedback mode may be a positive feedback and negative feedback mode for an activation or deactivation message for semi-persistent group-common downlink shared channels.

In some examples, UE 115-d may transmit, to base station 105-b, an acknowledgment feedback message to acknowledge release of the at least one activated SPS configuration. Additionally, UE 115-d may determine a bit location of the acknowledgment feedback message based on a TDRA table row index received in the DCI, a feedback timing indicator field value (e.g., K1) received in the deactivation message, or a combination thereof. In some examples, UE 115-d may transmit the acknowledgment feedback message including a single bit to acknowledge release of one or more activated SPS configurations for group-common downlink shared channels, to acknowledge release of one or more activated SPS configurations for UE-specific downlink shared channels, or both. Additionally or alternatively, UE 115-d may transmit the acknowledgment feedback message including a first bit to acknowledge release of one or more activated SPS configurations for UE-specific downlink shared channels and a second bit to acknowledge release of one or more activated SPS configurations for group-common downlink shared channels.

Figure 5:
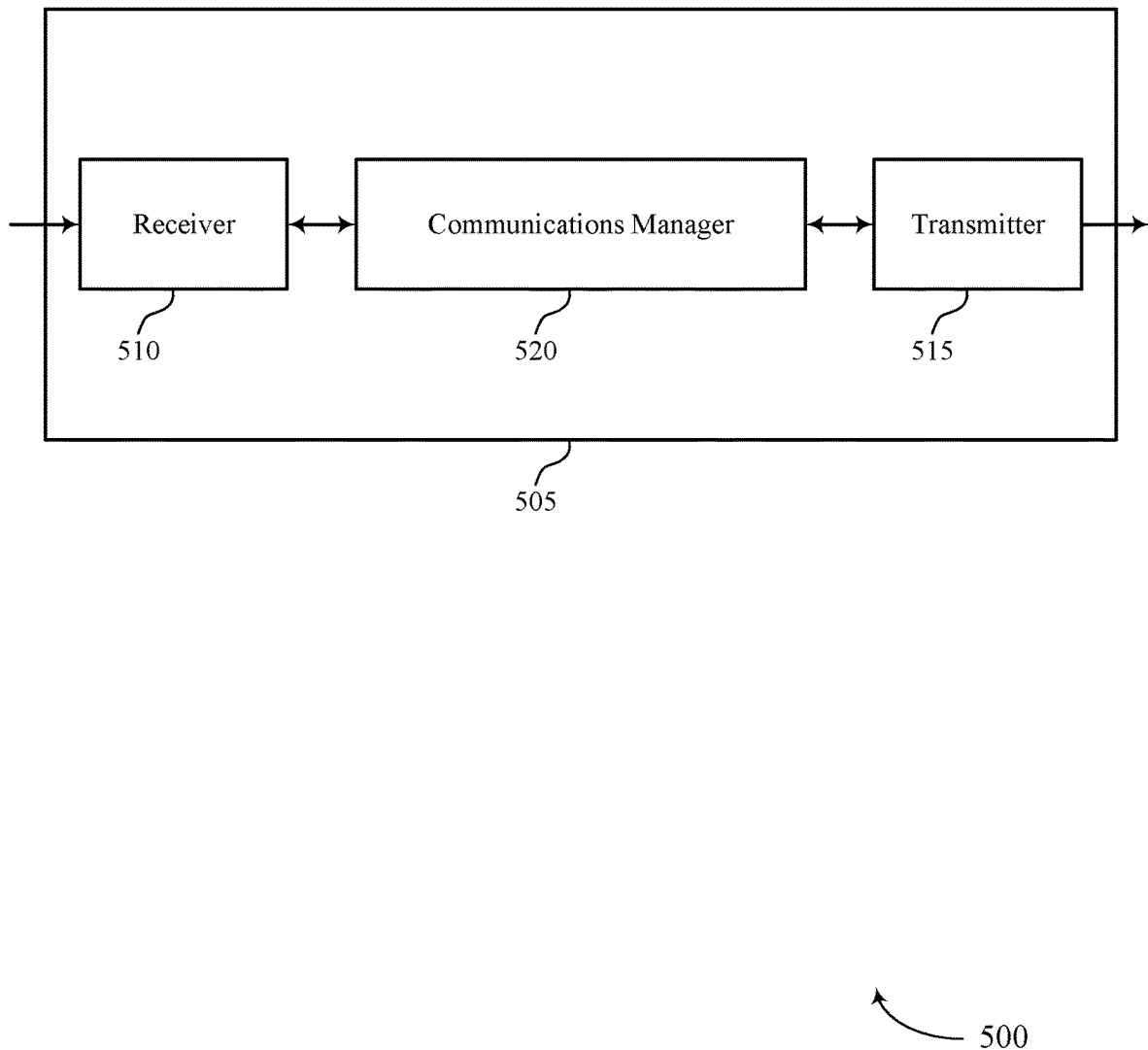
FIGS. 5 and 6 show block diagrams of devices that support activation and release for group-common downlink channels with repetitions in accordance with aspects of the present disclosure.

FIG. 5 shows a block diagram 500 of a device 505 that supports activation and release for group-common downlink channels with repetitions in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to activation and release for group-common downlink channels with repetitions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to activation and release for group-common downlink channels with repetitions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of activation and release for group-common downlink channels with repetitions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, one or more semi-persistent scheduling configurations for respective group-common downlink shared channels. The communications manager 520 may be configured as or otherwise support a means for receiving downlink control information that includes a feedback process field, a value of the feedback process field indicative of at least one semi-persistent scheduling configuration of the one or more semi-persistent scheduling configurations that is to be activated. The communications manager 520 may be configured as or otherwise support a means for monitoring for the one or more group-common downlink shared channels from the base station based on the value of the feedback process field in the downlink control information.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources.

Figure 6:
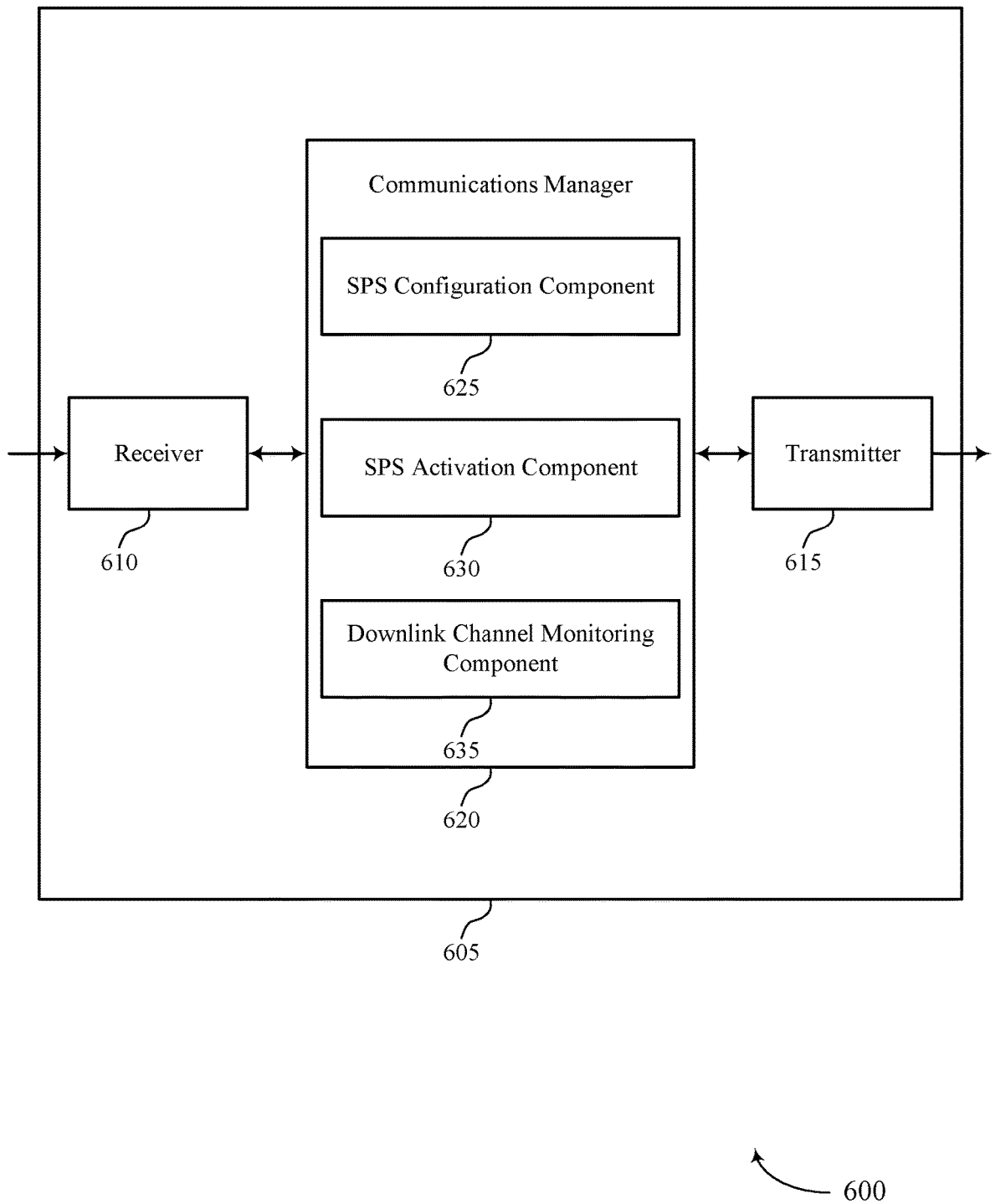

FIG. 6 shows a block diagram 600 of a device 605 that supports activation and release for group-common downlink channels with repetitions in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to activation and release for group-common downlink channels with repetitions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to activation and release for group-common downlink channels with repetitions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of activation and release for group-common downlink channels with repetitions as described herein. For example, the communications manager 620 may include an SPS configuration component 625, an SPS activation component 630, a downlink channel monitoring component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The SPS configuration component 625 may be configured as or otherwise support a means for receiving, from a base station, one or more semi-persistent scheduling configurations for respective group-common downlink shared channels. The SPS activation component 630 may be configured as or otherwise support a means for receiving downlink control information that includes a feedback process field, a value of the feedback process field indicative of at least one semi-persistent scheduling configuration of the one or more semi-persistent scheduling configurations that is to be activated. The downlink channel monitoring component 635 may be configured as or otherwise support a means for monitoring for the one or more group-common downlink shared channels from the base station based on the value of the feedback process field in the downlink control information.

Figure 7:
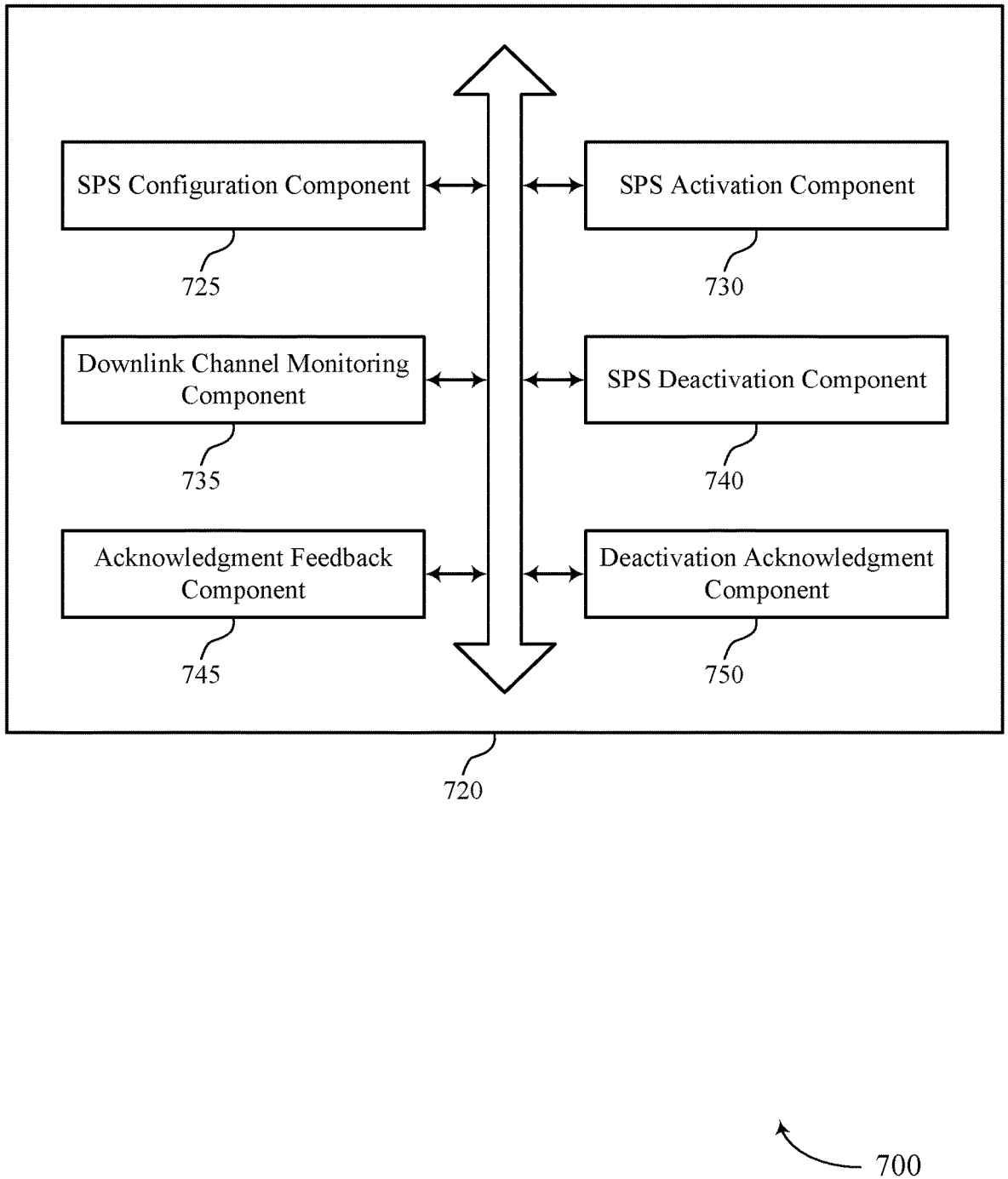
FIG. 7 shows a block diagram of a communications manager that supports activation and release for group-common downlink channels with repetitions in accordance with aspects of the present disclosure.

FIG. 7 shows a block diagram 700 of a communications manager 720 that supports activation and release for group-common downlink channels with repetitions in accordance with aspects of the present disclosure. The communications manager 720 may be an example of aspects of a communications manager 520, a communications manager 620, or both, as described herein. The communications manager 720, or various components thereof, may be an example of means for performing various aspects of activation and release for group-common downlink channels with repetitions as described herein. For example, the communications manager 720 may include an SPS configuration component 725, an SPS activation component 730, a downlink channel monitoring component 735, an SPS deactivation component 740, an acknowledgment feedback component 745, a deactivation acknowledgment component 750, or any combination thereof. Each of these components may communicate, directly or indirectly, with one another (e.g., via one or more buses).

The communications manager 720 may support wireless communications at a UE in accordance with examples as disclosed herein. The SPS configuration component 725 may be configured as or otherwise support a means for receiving, from a base station, one or more semi-persistent scheduling configurations for respective group-common downlink shared channels. The SPS activation component 730 may be configured as or otherwise support a means for receiving downlink control information that includes a feedback process field, a value of the feedback process field indicative of at least one semi-persistent scheduling configuration of the one or more semi-persistent scheduling configurations that is to be activated. The downlink channel monitoring component 735 may be configured as or otherwise support a means for monitoring for the one or more group-common downlink shared channels from the base station based on the value of the feedback process field in the downlink control information.

In some examples, the SPS activation component 730 may be configured as or otherwise support a means for determining to activate the at least one semi-persistent scheduling configuration based on a downlink control information format of the downlink control information, the value of the feedback process field in the downlink control information format, a configuration activation state list message, or a combination thereof.

In some examples, to support receiving the downlink control information, the SPS activation component 730 may be configured as or otherwise support a means for receiving a group-common downlink control channel including the downlink control information.

In some examples, the group-common downlink control channel includes an indication to activate monitoring resources configured for at least one or more group-common semi-persistent downlink shared channels.

In some examples, to support receiving the downlink control information, the SPS activation component 730 may be configured as or otherwise support a means for receiving a UE-specific downlink control channel configured for the UE including the downlink control information.

In some examples, the UE-specific downlink control channel includes an indication to activate monitoring resources configured for at least one or more UE-specific semi-persistent downlink shared channels, one or more group-common semi-persistent downlink shared channels, or a combination thereof.

In some examples, the SPS deactivation component 740 may be configured as or otherwise support a means for receiving, from the base station, a deactivation message including an indication to release the at least one activated semi-persistent scheduling configuration. In some examples, the SPS deactivation component 740 may be configured as or otherwise support a means for releasing the at least one activated semi-persistent scheduling configuration based on receiving the deactivation message.

In some examples, the SPS deactivation component 740 may be configured as or otherwise support a means for determining to release the at least one activated semi-persistent scheduling configuration based on a common frequency resource, a configuration deactivation state list message, a downlink control information format of the deactivation message, a feedback process field in the downlink control information format, or a combination thereof.

In some examples, to support receiving the deactivation message, the SPS deactivation component 740 may be configured as or otherwise support a means for receiving a group-common downlink control channel including the deactivation message.

In some examples, the deactivation message includes an indication to release monitoring resources configured for at least one or more group-common semi-persistent downlink shared channels.

In some examples, to support receiving the deactivation message, the SPS deactivation component 740 may be configured as or otherwise support a means for receiving a UE-specific downlink control channel including the deactivation message.

In some examples, the deactivation message includes an indication to release monitoring resources configured for at least one or more UE-specific semi-persistent downlink shared channels, one or more group-common semi-persistent downlink shared channels, or a combination thereof.

In some examples, the deactivation acknowledgment component 750 may be configured as or otherwise support a means for transmitting, to the base station, an acknowledgment feedback message to acknowledge release of the at least one activated semi-persistent scheduling configuration.

In some examples, the deactivation acknowledgment component 750 may be configured as or otherwise support a means for determining a bit location of the acknowledgment feedback message based on a time domain resource allocation table row index received in the downlink control information, a feedback timing indicator field value received in the deactivation message, or a combination thereof.

In some examples, to support transmitting the acknowledgment feedback message, the deactivation acknowledgment component 750 may be configured as or otherwise support a means for transmitting the acknowledgment feedback message including a single bit to acknowledge release of one or more activated semi-persistent scheduling configurations for group-common downlink shared channels, to acknowledge release of one or more activated semi-persistent scheduling configurations for UE-specific downlink shared channels, or both.

In some examples, to support transmitting the acknowledgment feedback message, the deactivation acknowledgment component 750 may be configured as or otherwise support a means for transmitting the acknowledgment feedback message including a first bit to acknowledge release of one or more activated semi-persistent scheduling configurations for UE-specific downlink shared channels and a second bit to acknowledge release of one or more activated semi-persistent scheduling configurations for group-common downlink shared channels.

In some examples, the acknowledgment feedback component 745 may be configured as or otherwise support a means for receiving, from the base station, a configuration of an acknowledgment feedback mode for transmitting acknowledgment feedback to indicate whether the downlink control information is successfully received or not, whether a deactivation message is successfully received or not, or both.

In some examples, the acknowledgment feedback mode includes a positive feedback and negative feedback mode, a negative feedback mode, a no feedback mode, or a combination thereof.

In some examples, the configuration of the acknowledgment feedback mode is different than a configuration for acknowledgment feedback for a group-common downlink shared channel associated with a dynamic grant, for a group-common downlink shared channel associated with a configured grant, for a retransmission of semi-persistent group-common downlink shared channels, or a combination thereof.

In some examples, the configuration of the acknowledgment feedback mode is a positive feedback and negative feedback mode for an activation or deactivation message for semi-persistent group-common downlink shared channels.

Figure 8:
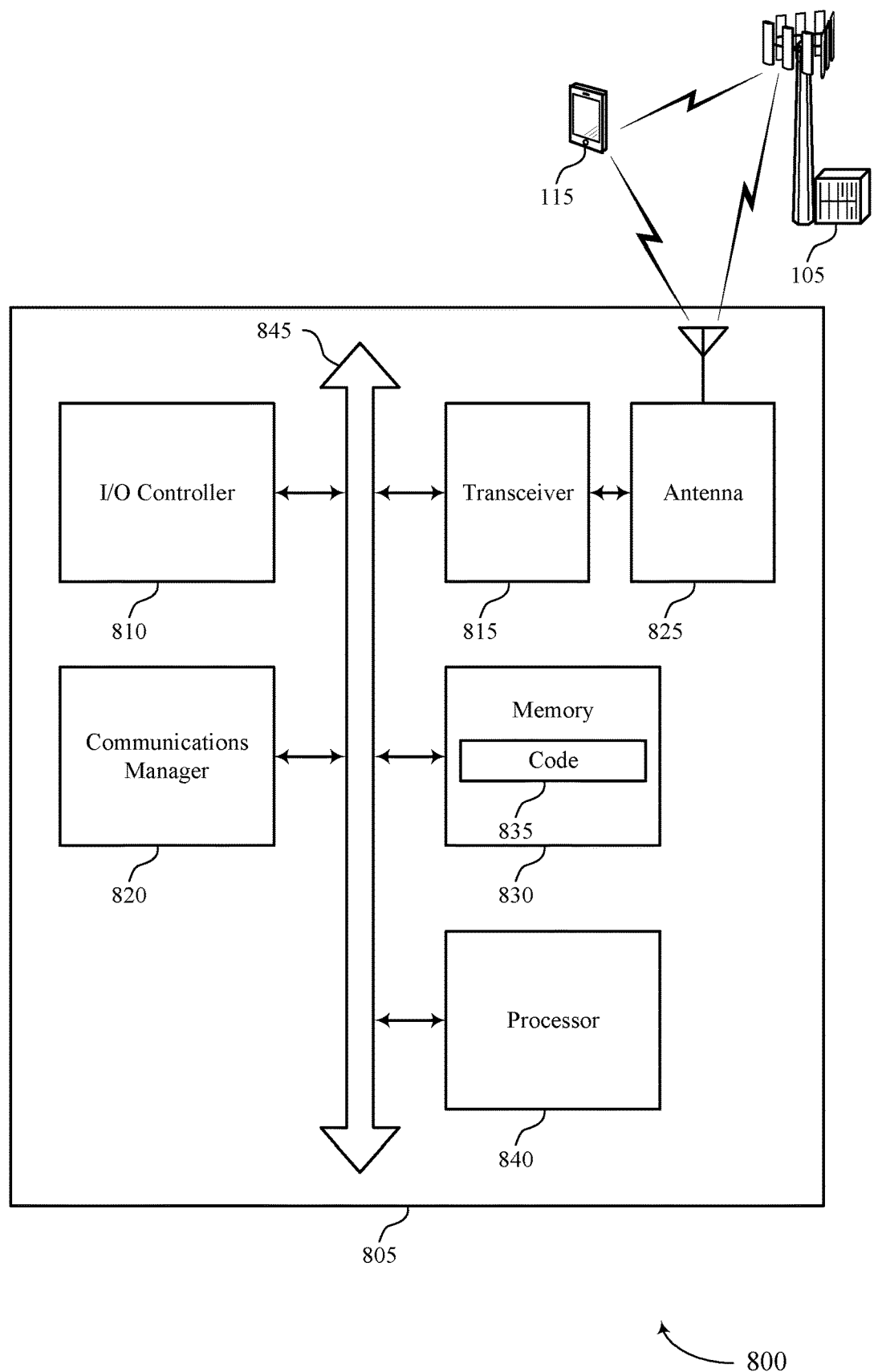
FIG. 8 shows a diagram of a system including a device that supports activation and release for group-common downlink channels with repetitions in accordance with aspects of the present disclosure.

FIG. 8 shows a diagram of a system 800 including a device 805 that supports activation and release for group-common downlink channels with repetitions in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting activation and release for group-common downlink channels with repetitions). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, one or more semi-persistent scheduling configurations for respective group-common downlink shared channels. The communications manager 820 may be configured as or otherwise support a means for receiving downlink control information that includes a feedback process field, a value of the feedback process field indicative of at least one semi-persistent scheduling configuration of the one or more semi-persistent scheduling configurations that is to be activated. The communications manager 820 may be configured as or otherwise support a means for monitoring for the one or more group-common downlink shared channels from the base station based on the value of the feedback process field in the downlink control information.

By including or configuring the communications manager 820 in accordance with examples as described herein, the device 805 may support techniques for improved communication reliability, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of activation and release for group-common downlink channels with repetitions as described herein, or the processor 840 and the memory 830 may be otherwise configured to perform or support such operations.

Figure 9:
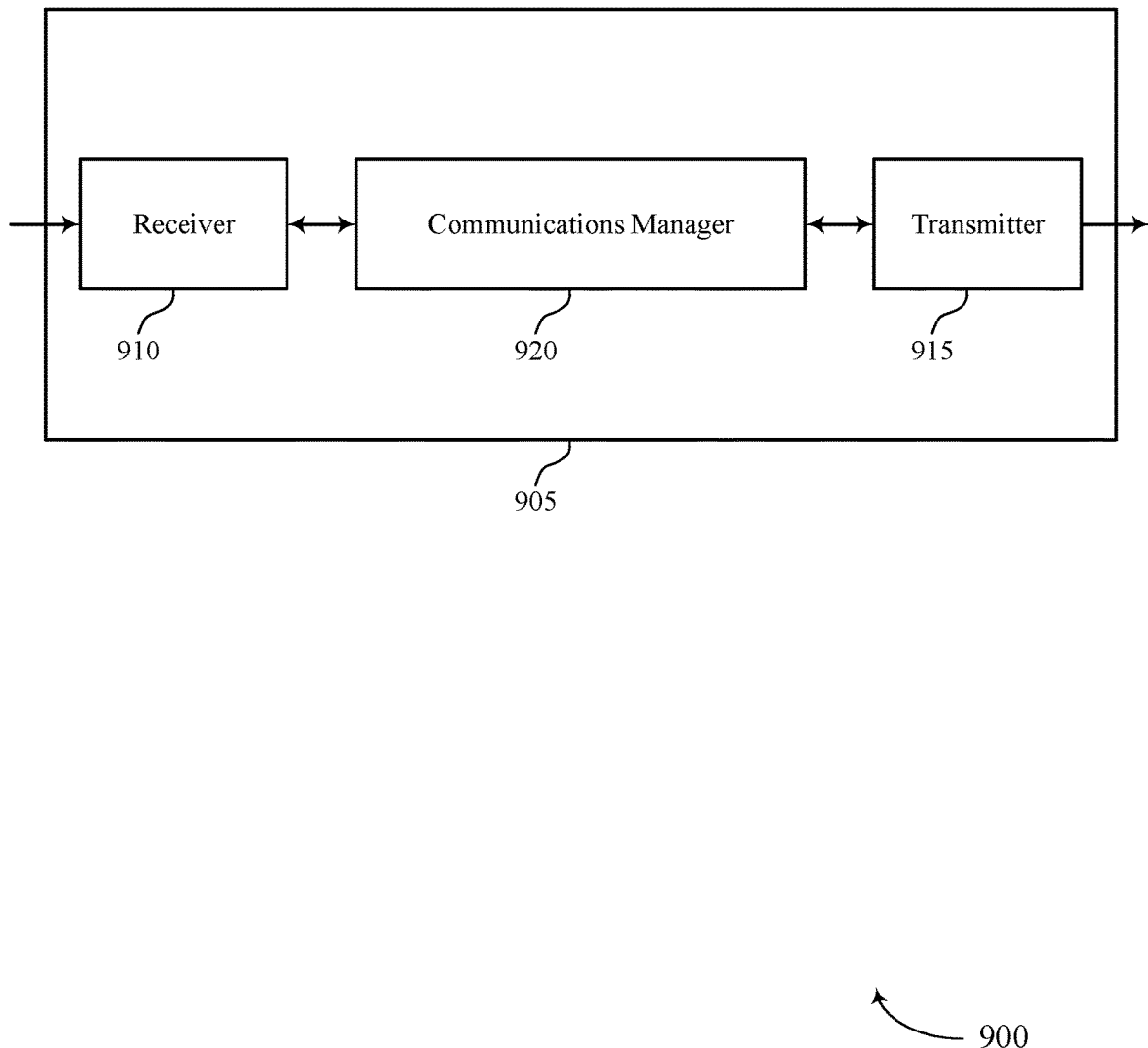
FIGS. 9 and 10 show block diagrams of devices that support activation and release for group-common downlink channels with repetitions in accordance with aspects of the present disclosure.

FIG. 9 shows a block diagram 900 of a device 905 that supports activation and release for group-common downlink channels with repetitions in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to activation and release for group-common downlink channels with repetitions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to activation and release for group-common downlink channels with repetitions). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of activation and release for group-common downlink channels with repetitions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to one or more user equipment (UEs), one or more semi-persistent scheduling configurations for respective group-common downlink shared channels. The communications manager 920 may be configured as or otherwise support a means for transmitting, to at least a first UE of the one or more UEs, downlink control information that includes a feedback process field, a value of the feedback process field indicative of at least one semi-persistent scheduling configuration of the one or more semi-persistent scheduling configurations that is to be activated. The communications manager 920 may be configured as or otherwise support a means for transmitting, to the at least first UE, one or more group-common downlink shared channels according to corresponding numbers of repetitions based on the transmitting the downlink control information.

Figure 10:
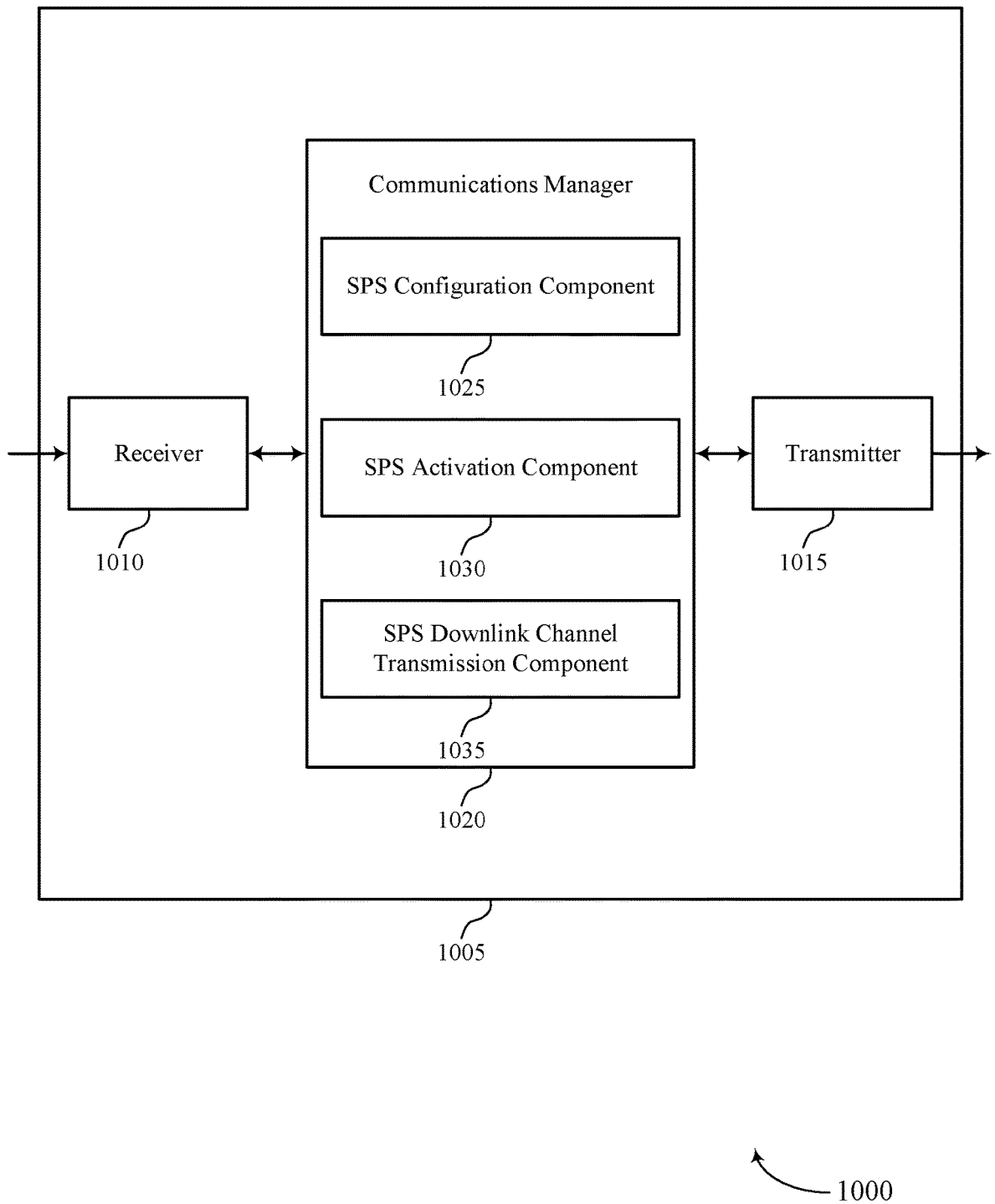

FIG. 10 shows a block diagram 1000 of a device 1005 that supports activation and release for group-common downlink channels with repetitions in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to activation and release for group-common downlink channels with repetitions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to activation and release for group-common downlink channels with repetitions). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of activation and release for group-common downlink channels with repetitions as described herein. For example, the communications manager 1020 may include an SPS configuration component 1025, an SPS activation component 1030, an SPS downlink channel transmission component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The SPS configuration component 1025 may be configured as or otherwise support a means for transmitting, to one or more user equipment (UEs), one or more semi-persistent scheduling configurations for respective group-common downlink shared channels. The SPS activation component 1030 may be configured as or otherwise support a means for transmitting, to at least a first UE of the one or more UEs, downlink control information that includes a feedback process field, a value of the feedback process field indicative of at least one semi-persistent scheduling configuration of the one or more semi-persistent scheduling configurations that is to be activated. The SPS downlink channel transmission component 1035 may be configured as or otherwise support a means for transmitting, to the at least first UE, one or more group-common downlink shared channels according to corresponding numbers of repetitions based on the transmitting the downlink control information.

Figure 11:
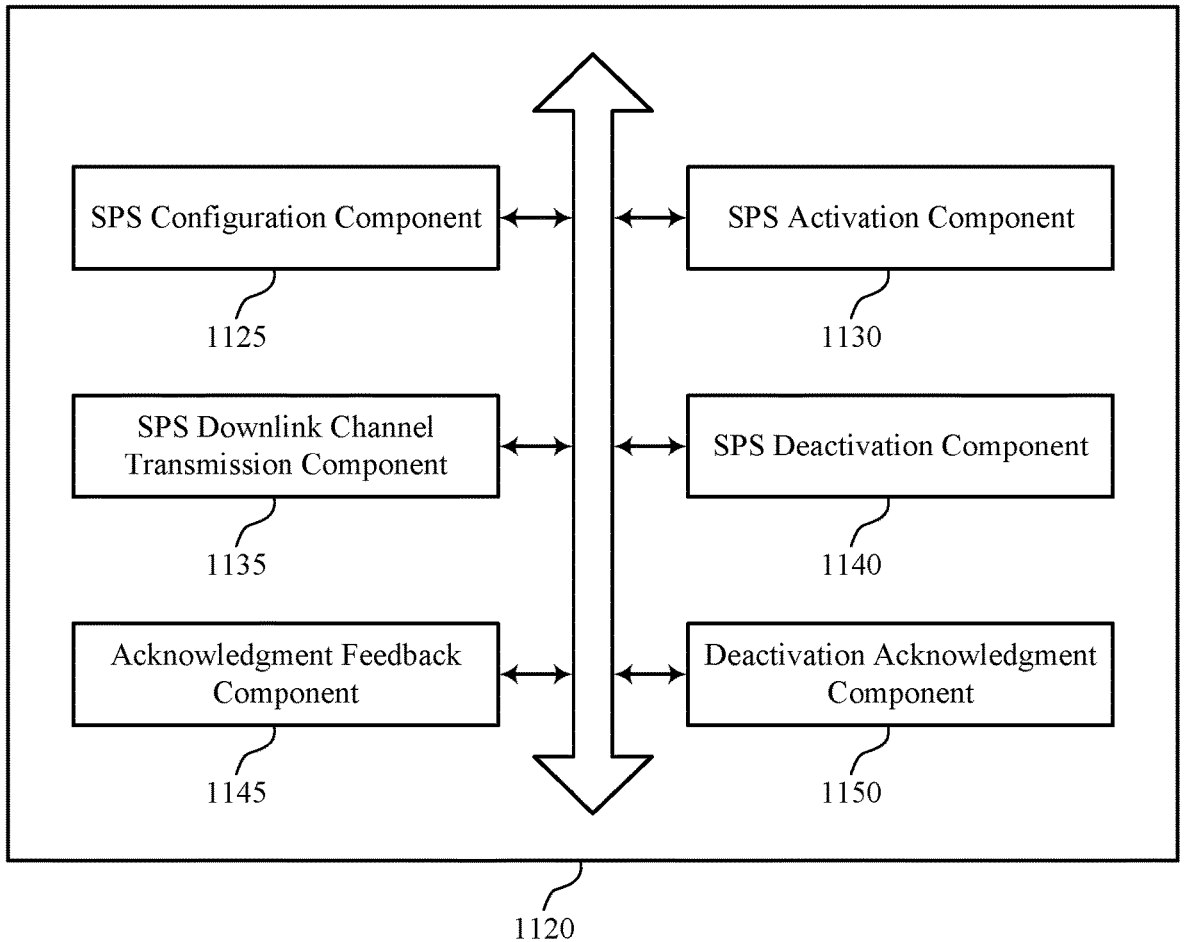
FIG. 11 shows a block diagram of a communications manager that supports activation and release for group-common downlink channels with repetitions in accordance with aspects of the present disclosure.

FIG. 11 shows a block diagram 1100 of a communications manager 1120 that supports activation and release for group-common downlink channels with repetitions in accordance with aspects of the present disclosure. The communications manager 1120 may be an example of aspects of a communications manager 920, a communications manager 1020, or both, as described herein. The communications manager 1120, or various components thereof, may be an example of means for performing various aspects of activation and release for group-common downlink channels with repetitions as described herein. For example, the communications manager 1120 may include an SPS configuration component 1125, an SPS activation component 1130, an SPS downlink channel transmission component 1135, an SPS deactivation component 1140, an acknowledgment feedback component 1145, a deactivation acknowledgment component 1150, or any combination thereof. Each of these components may communicate, directly or indirectly, with one another (e.g., via one or more buses).

The communications manager 1120 may support wireless communications at a base station in accordance with examples as disclosed herein. The SPS configuration component 1125 may be configured as or otherwise support a means for transmitting, to one or more user equipment (UEs), one or more semi-persistent scheduling configurations for respective group-common downlink shared channels. The SPS activation component 1130 may be configured as or otherwise support a means for transmitting, to at least a first UE of the one or more UEs, downlink control information that includes a feedback process field, a value of the feedback process field indicative of at least one semi-persistent scheduling configuration of the one or more semi-persistent scheduling configurations that is to be activated. The SPS downlink channel transmission component 1135 may be configured as or otherwise support a means for transmitting, to the at least first UE, one or more group-common downlink shared channels according to corresponding numbers of repetitions based on the transmitting the downlink control information.

In some examples, to support transmitting the downlink control information, the SPS activation component 1130 may be configured as or otherwise support a means for transmitting, via the downlink control information, an indication for the at least first UE to activate the at least one semi-persistent scheduling configuration based on a downlink control information format of the downlink control information, the value of the feedback process field in the downlink control information format, a configuration activation state list message, or a combination thereof.

In some examples, to support transmitting the downlink control information, the SPS activation component 1130 may be configured as or otherwise support a means for transmitting a group-common downlink control channel including the downlink control information.

In some examples, the group-common downlink control channel includes an indication to activate monitoring resources configured for at least one or more group-common semi-persistent downlink shared channels.

In some examples, to support transmitting the downlink control information, the SPS activation component 1130 may be configured as or otherwise support a means for transmitting a UE-specific downlink control channel configured for the UE including the downlink control information.

In some examples, the UE-specific downlink control channel includes an indication for the at least first UE to activate monitoring resources configured for at least one or more UE-specific semi-persistent downlink shared channels, one or more group-common semi-persistent downlink shared channels, or a combination thereof.

In some examples, the SPS deactivation component 1140 may be configured as or otherwise support a means for transmitting, to the at least first UE, a deactivation message including an indication to release the at least one activated semi-persistent scheduling configuration.

In some examples, the deactivation message indicates for the at least first UE to release the at least one activated semi-persistent scheduling configuration based on a configuration deactivation state list message, a downlink control information format of the deactivation message, a feedback process field in the downlink control information format, or a combination thereof.

In some examples, to support transmitting the deactivation message, the SPS deactivation component 1140 may be configured as or otherwise support a means for transmitting a group-common downlink control channel including the deactivation message.

In some examples, the deactivation message includes an indication for the at least first UE to release monitoring resources configured for at least one or more group-common semi-persistent downlink shared channels.

In some examples, to support transmitting the deactivation message, the SPS deactivation component 1140 may be configured as or otherwise support a means for transmitting a UE-specific downlink control channel including the deactivation message.

In some examples, the deactivation message includes an indication for the at least first UE to release monitoring resources configured for at least one or more UE-specific semi-persistent downlink shared channels, one or more group-common semi-persistent downlink shared channels, or a combination thereof.

In some examples, the deactivation acknowledgment component 1150 may be configured as or otherwise support a means for receiving, from the at least first UE, an acknowledgment feedback message to acknowledge release of the at least one activated semi-persistent scheduling configuration.

In some examples, a bit location of the acknowledgment feedback message is based on a time domain resource allocation table row index received in the downlink control information, a feedback timing indicator field value received in the deactivation message, or a combination thereof.

In some examples, to support receiving the acknowledgment feedback message, the deactivation acknowledgment component 1150 may be configured as or otherwise support a means for receiving the acknowledgment feedback message including a single bit to acknowledge release of one or more activated semi-persistent scheduling configurations for group-common downlink shared channels, to acknowledge release of one or more activated semi-persistent scheduling configurations for UE-specific downlink shared channels, or both.

In some examples, to support receiving the acknowledgment feedback message, the deactivation acknowledgment component 1150 may be configured as or otherwise support a means for receiving the acknowledgment feedback message including a first bit to acknowledge release of one or more activated semi-persistent scheduling configurations for UE-specific downlink shared channels and a second bit to acknowledge release of one or more activated semi-persistent scheduling configurations for group-common downlink shared channels.

In some examples, the acknowledgment feedback component 1145 may be configured as or otherwise support a means for transmitting, to the at least first UE, a configuration of an acknowledgment feedback mode for transmitting acknowledgment feedback to indicate whether the downlink control information is successfully received or not, whether a deactivation message is successfully received or not, or both.

In some examples, the acknowledgment feedback mode includes a positive feedback and negative feedback mode, a negative feedback mode, a no feedback mode, or a combination thereof.

In some examples, the configuration of the acknowledgment feedback mode is different than a configuration for acknowledgment feedback for a group-common downlink shared channel associated with a dynamic grant, for a group-common downlink shared channel associated with a configured grant, for a retransmission of semi-persistent group-common downlink shared channels, or a combination thereof.

In some examples, the configuration of the acknowledgment feedback mode is a positive feedback and negative feedback mode for an activation or deactivation message for semi-persistent group-common downlink shared channels.

Figure 12:
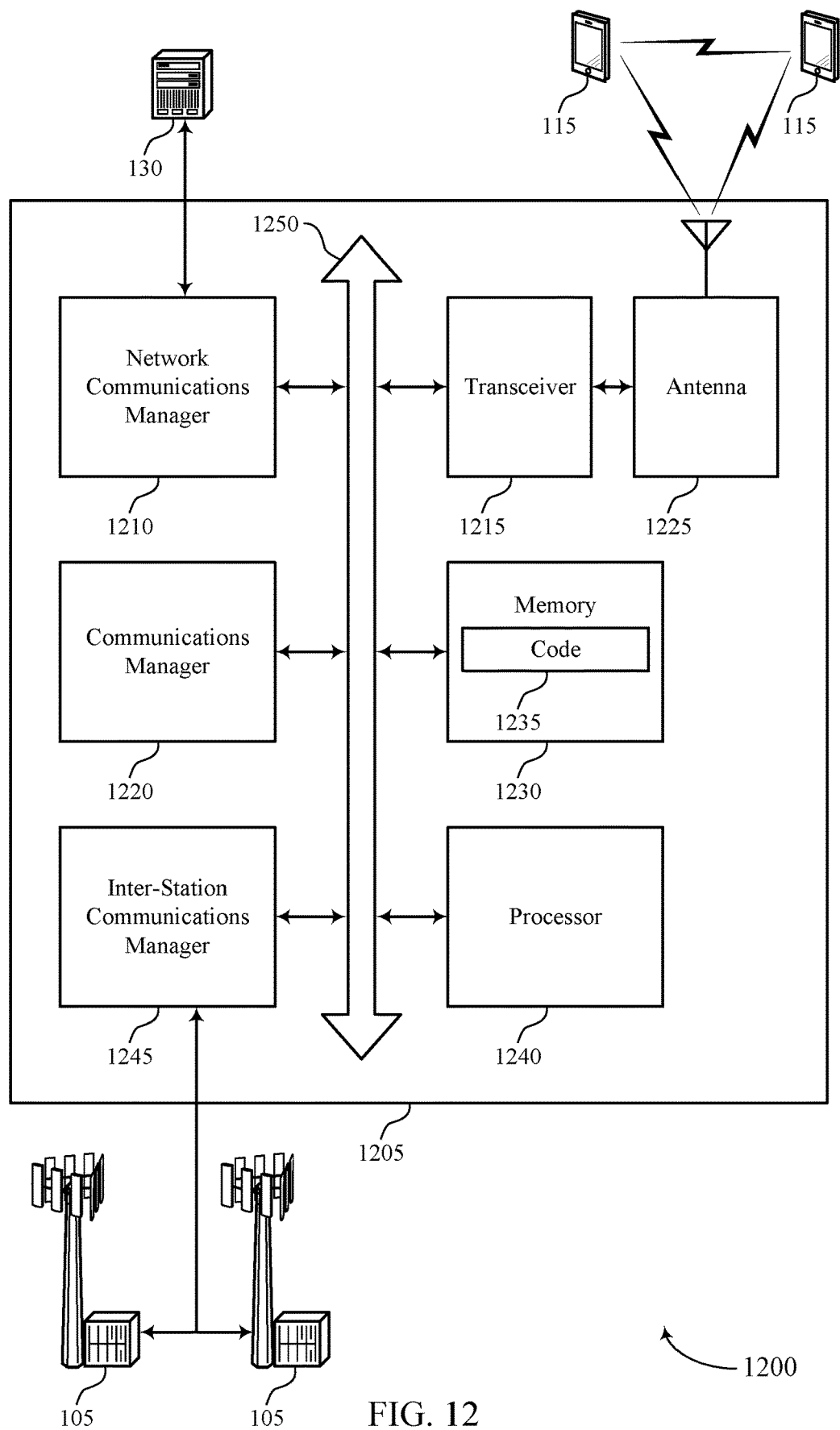
FIG. 12 shows a diagram of a system including a device that supports activation and release for group-common downlink channels with repetitions in accordance with aspects of the present disclosure.

FIG. 12 shows a diagram of a system 1200 including a device 1205 that supports activation and release for group-common downlink channels with repetitions in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting activation and release for group-common downlink channels with repetitions). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to one or more user equipment (UEs), one or more semi-persistent scheduling configurations for respective group-common downlink shared channels. The communications manager 1220 may be configured as or otherwise support a means for transmitting, to at least a first UE of the one or more UEs, downlink control information that includes a feedback process field, a value of the feedback process field indicative of at least one semi-persistent scheduling configuration of the one or more semi-persistent scheduling configurations that is to be activated. The communications manager 1220 may be configured as or otherwise support a means for transmitting, to the at least first UE, one or more group-common downlink shared channels according to corresponding numbers of repetitions based on the transmitting the downlink control information.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of activation and release for group-common downlink channels with repetitions as described herein, or the processor 1240 and the memory 1230 may be otherwise configured to perform or support such operations.

Figure 13:
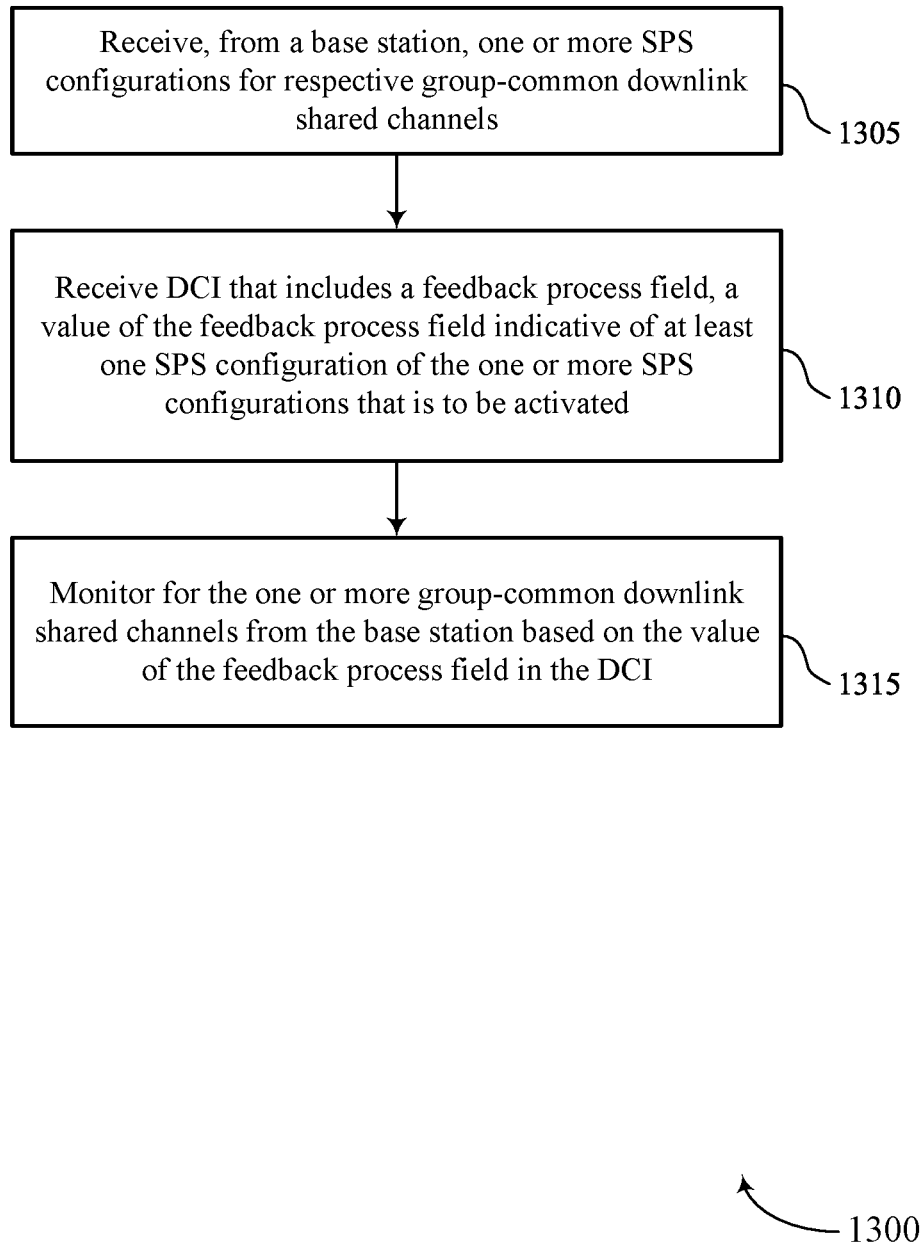
FIGS. 13 through 19 show flowcharts illustrating methods that support activation and release for group-common downlink channels with repetitions in accordance with aspects of the present disclosure.

FIG. 13 shows a flowchart illustrating a method 1300 that supports activation and release for group-common downlink channels with repetitions in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, one or more semi-persistent scheduling configurations for respective group-common downlink shared channels. The operations of 1305 may be performed in accordance with examples as disclosed herein. In some examples, aspects of the operations of 1305 may be performed by an SPS configuration component 725 as described with reference to FIG. 7.

At 1310, the method may include receiving downlink control information that includes a feedback process field, a value of the feedback process field indicative of at least one semi-persistent scheduling configuration of the one or more semi-persistent scheduling configurations that is to be activated. The operations of 1310 may be performed in accordance with examples as disclosed herein. In some examples, aspects of the operations of 1310 may be performed by an SPS activation component 730 as described with reference to FIG. 7.

At 1315, the method may include monitoring for the one or more group-common downlink shared channels from the base station based on the value of the feedback process field in the downlink control information. The operations of 1315 may be performed in accordance with examples as disclosed herein. In some examples, aspects of the operations of 1315 may be performed by a downlink channel monitoring component 735 as described with reference to FIG. 7.

Figure 14:
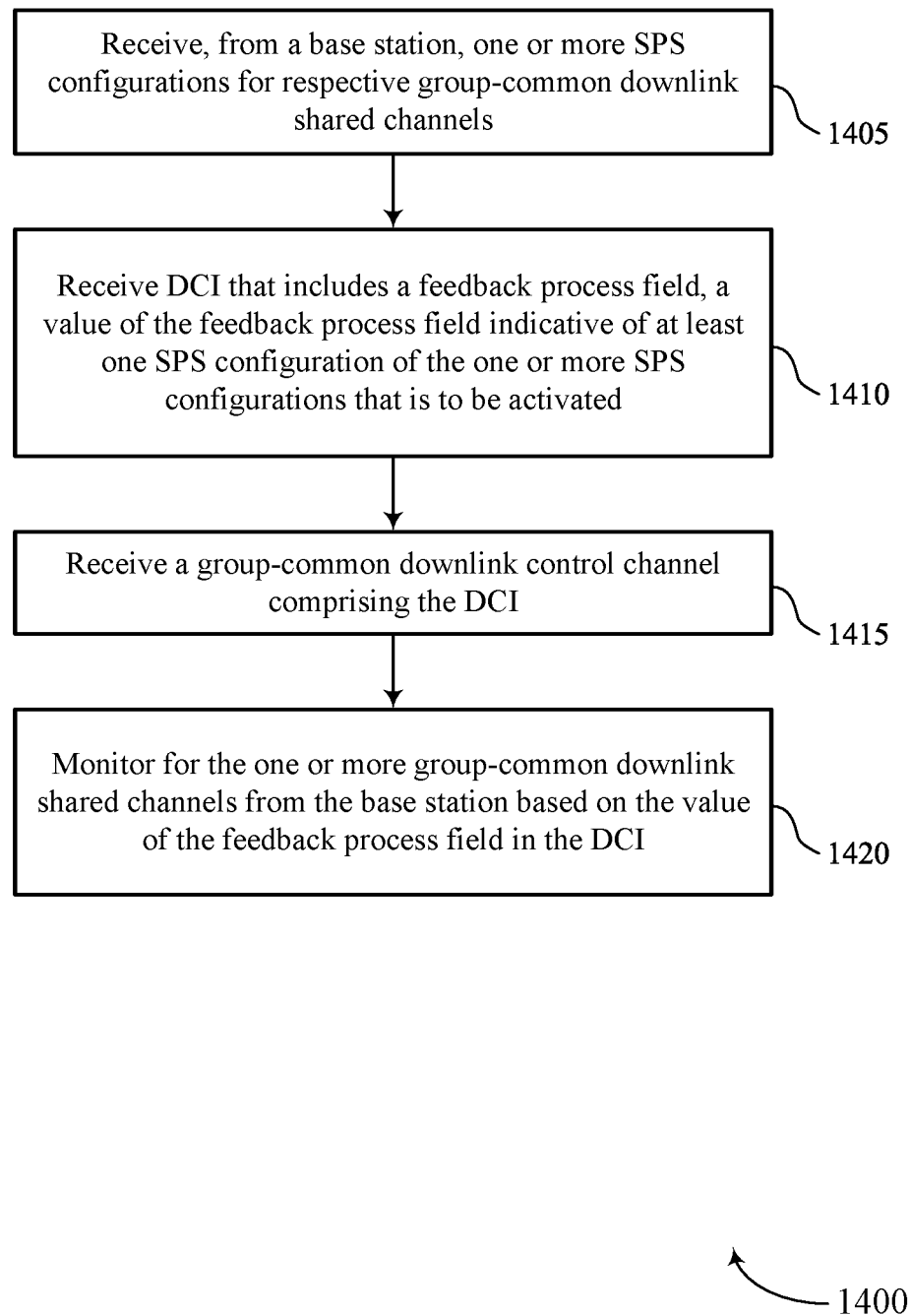

FIG. 14 shows a flowchart illustrating a method 1400 that supports activation and release for group-common downlink channels with repetitions in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, one or more semi-persistent scheduling configurations for respective group-common downlink shared channels. The operations of 1405 may be performed in accordance with examples as disclosed herein. In some examples, aspects of the operations of 1405 may be performed by an SPS configuration component 725 as described with reference to FIG. 7.

At 1410, the method may include receiving downlink control information that includes a feedback process field, a value of the feedback process field indicative of at least one semi-persistent scheduling configuration of the one or more semi-persistent scheduling configurations that is to be activated. The operations of 1410 may be performed in accordance with examples as disclosed herein. In some examples, aspects of the operations of 1410 may be performed by an SPS activation component 730 as described with reference to FIG. 7.

At 1415, the method may include receiving a group-common downlink control channel including the downlink control information. The operations of 1415 may be performed in accordance with examples as disclosed herein. In some examples, aspects of the operations of 1415 may be performed by an SPS activation component 730 as described with reference to FIG. 7.

At 1420, the method may include monitoring for the one or more group-common downlink shared channels from the base station based on the value of the feedback process field in the downlink control information. The operations of 1420 may be performed in accordance with examples as disclosed herein. In some examples, aspects of the operations of 1420 may be performed by a downlink channel monitoring component 735 as described with reference to FIG. 7.

Figure 15:
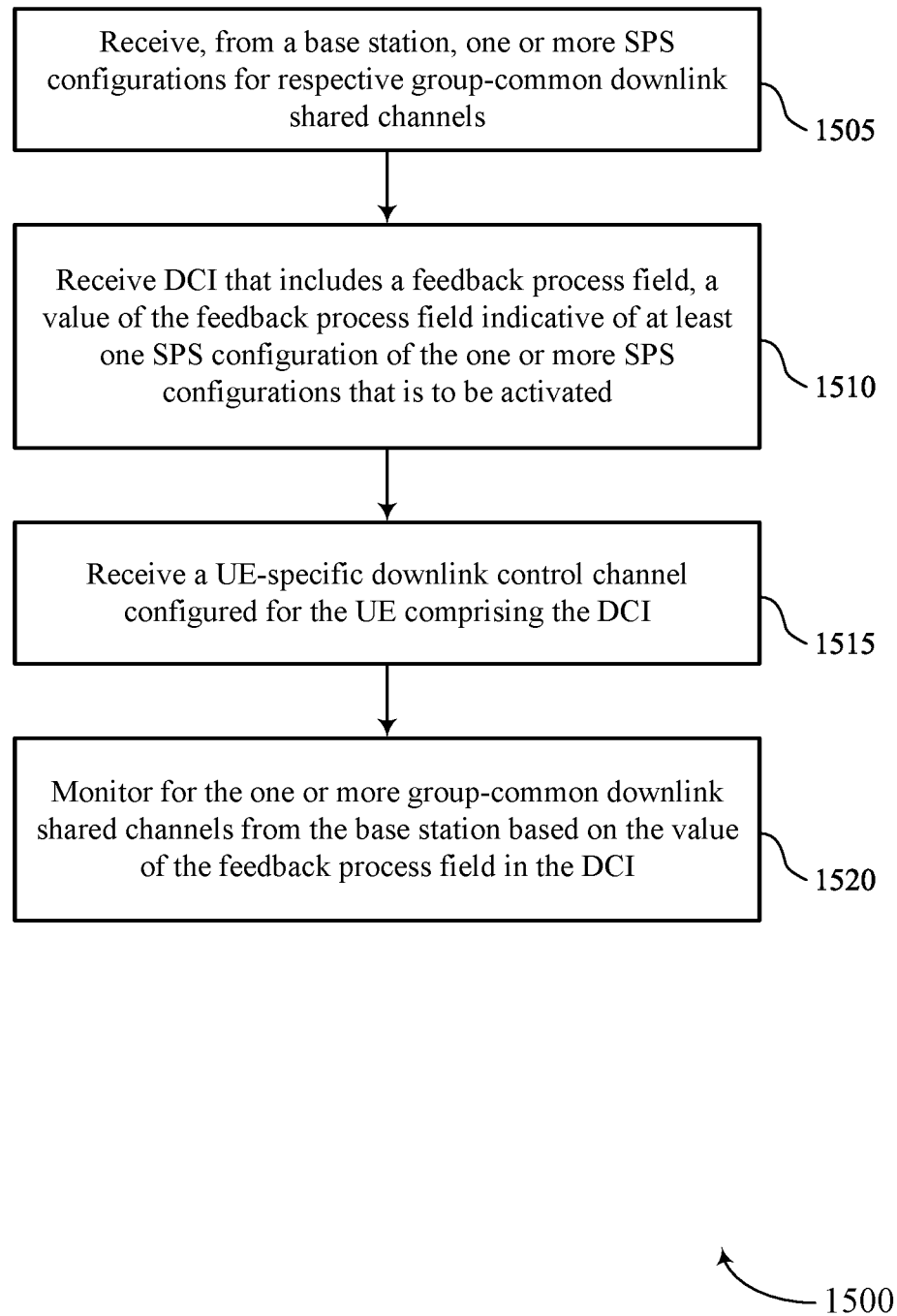

FIG. 15 shows a flowchart illustrating a method 1500 that supports activation and release for group-common downlink channels with repetitions in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, one or more semi-persistent scheduling configurations for respective group-common downlink shared channels. The operations of 1505 may be performed in accordance with examples as disclosed herein. In some examples, aspects of the operations of 1505 may be performed by an SPS configuration component 725 as described with reference to FIG. 7.

At 1510, the method may include receiving downlink control information that includes a feedback process field, a value of the feedback process field indicative of at least one semi-persistent scheduling configuration of the one or more semi-persistent scheduling configurations that is to be activated. The operations of 1510 may be performed in accordance with examples as disclosed herein. In some examples, aspects of the operations of 1510 may be performed by an SPS activation component 730 as described with reference to FIG. 7.

At 1515, the method may include receiving a UE-specific downlink control channel configured for the UE including the downlink control information. The operations of 1515 may be performed in accordance with examples as disclosed herein. In some examples, aspects of the operations of 1515 may be performed by an SPS activation component 730 as described with reference to FIG. 7.

At 1520, the method may include monitoring for the one or more group-common downlink shared channels from the base station based on the value of the feedback process field in the downlink control information. The operations of 1520 may be performed in accordance with examples as disclosed herein. In some examples, aspects of the operations of 1520 may be performed by a downlink channel monitoring component 735 as described with reference to FIG. 7.

Figure 16:
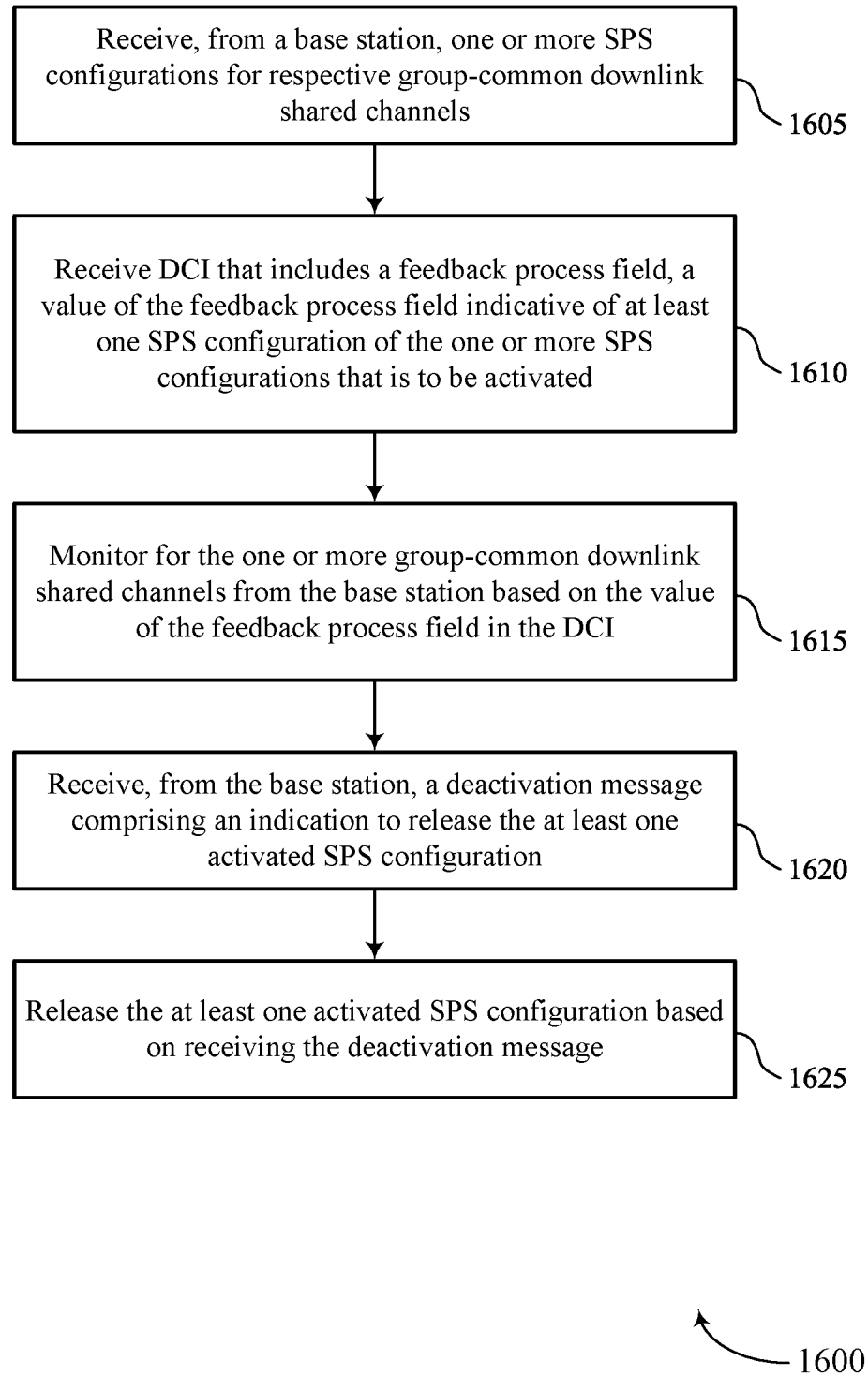

FIG. 16 shows a flowchart illustrating a method 1600 that supports activation and release for group-common downlink channels with repetitions in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, one or more semi-persistent scheduling configurations for respective group-common downlink shared channels. The operations of 1605 may be performed in accordance with examples as disclosed herein. In some examples, aspects of the operations of 1605 may be performed by an SPS configuration component 725 as described with reference to FIG. 7.

At 1610, the method may include receiving downlink control information that includes a feedback process field, a value of the feedback process field indicative of at least one semi-persistent scheduling configuration of the one or more semi-persistent scheduling configurations that is to be activated. The operations of 1610 may be performed in accordance with examples as disclosed herein. In some examples, aspects of the operations of 1610 may be performed by an SPS activation component 730 as described with reference to FIG. 7.

At 1615, the method may include monitoring for the one or more group-common downlink shared channels from the base station based on the value of the feedback process field in the downlink control information. The operations of 1615 may be performed in accordance with examples as disclosed herein. In some examples, aspects of the operations of 1615 may be performed by a downlink channel monitoring component 735 as described with reference to FIG. 7.

At 1620, the method may include receiving, from the base station, a deactivation message including an indication to release the at least one activated semi-persistent scheduling configuration. The operations of 1620 may be performed in accordance with examples as disclosed herein. In some examples, aspects of the operations of 1620 may be performed by an SPS deactivation component 740 as described with reference to FIG. 7.

At 1625, the method may include releasing the at least one activated semi-persistent scheduling configuration based on receiving the deactivation message. The operations of 1625 may be performed in accordance with examples as disclosed herein. In some examples, aspects of the operations of 1625 may be performed by an SPS deactivation component 740 as described with reference to FIG. 7.

Figure 17:
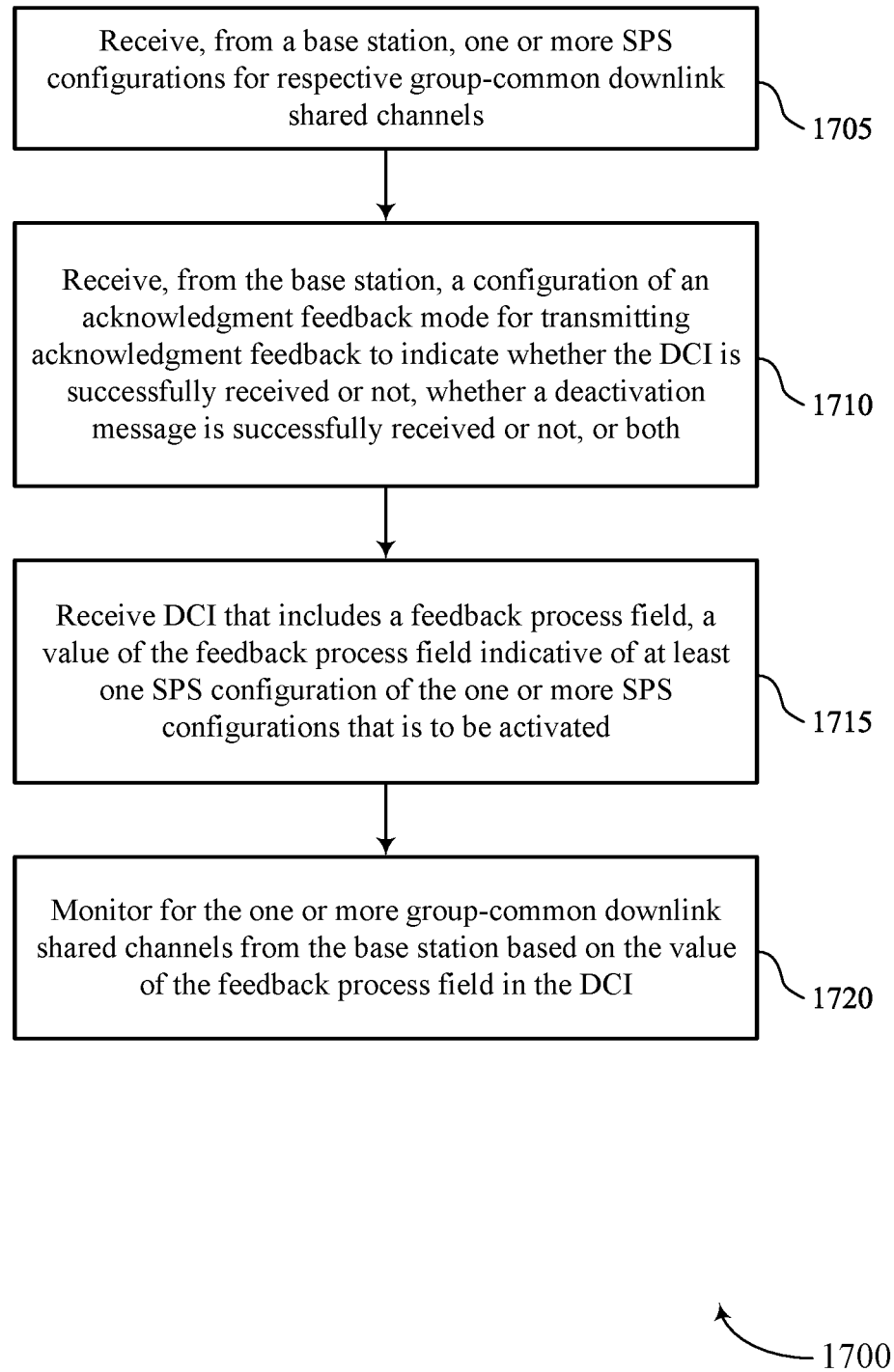

FIG. 17 shows a flowchart illustrating a method 1700 that supports activation and release for group-common downlink channels with repetitions in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, one or more semi-persistent scheduling configurations for respective group-common downlink shared channels. The operations of 1705 may be performed in accordance with examples as disclosed herein. In some examples, aspects of the operations of 1705 may be performed by an SPS configuration component 725 as described with reference to FIG. 7.

At 1710, the method may include receiving, from the base station, a configuration of an acknowledgment feedback mode for transmitting acknowledgment feedback to indicate whether the downlink control information is successfully received or not, whether a deactivation message is successfully received or not, or both. The operations of 1710 may be performed in accordance with examples as disclosed herein. In some examples, aspects of the operations of 1710 may be performed by an acknowledgment feedback component 745 as described with reference to FIG. 7.

At 1715, the method may include receiving downlink control information that includes a feedback process field, a value of the feedback process field indicative of at least one semi-persistent scheduling configuration of the one or more semi-persistent scheduling configurations that is to be activated. The operations of 1715 may be performed in accordance with examples as disclosed herein. In some examples, aspects of the operations of 1715 may be performed by an SPS activation component 730 as described with reference to FIG. 7.

At 1720, the method may include monitoring for the one or more group-common downlink shared channels from the base station based on the value of the feedback process field in the downlink control information. The operations of 1720 may be performed in accordance with examples as disclosed herein. In some examples, aspects of the operations of 1720 may be performed by a downlink channel monitoring component 735 as described with reference to FIG. 7.

Figure 18:
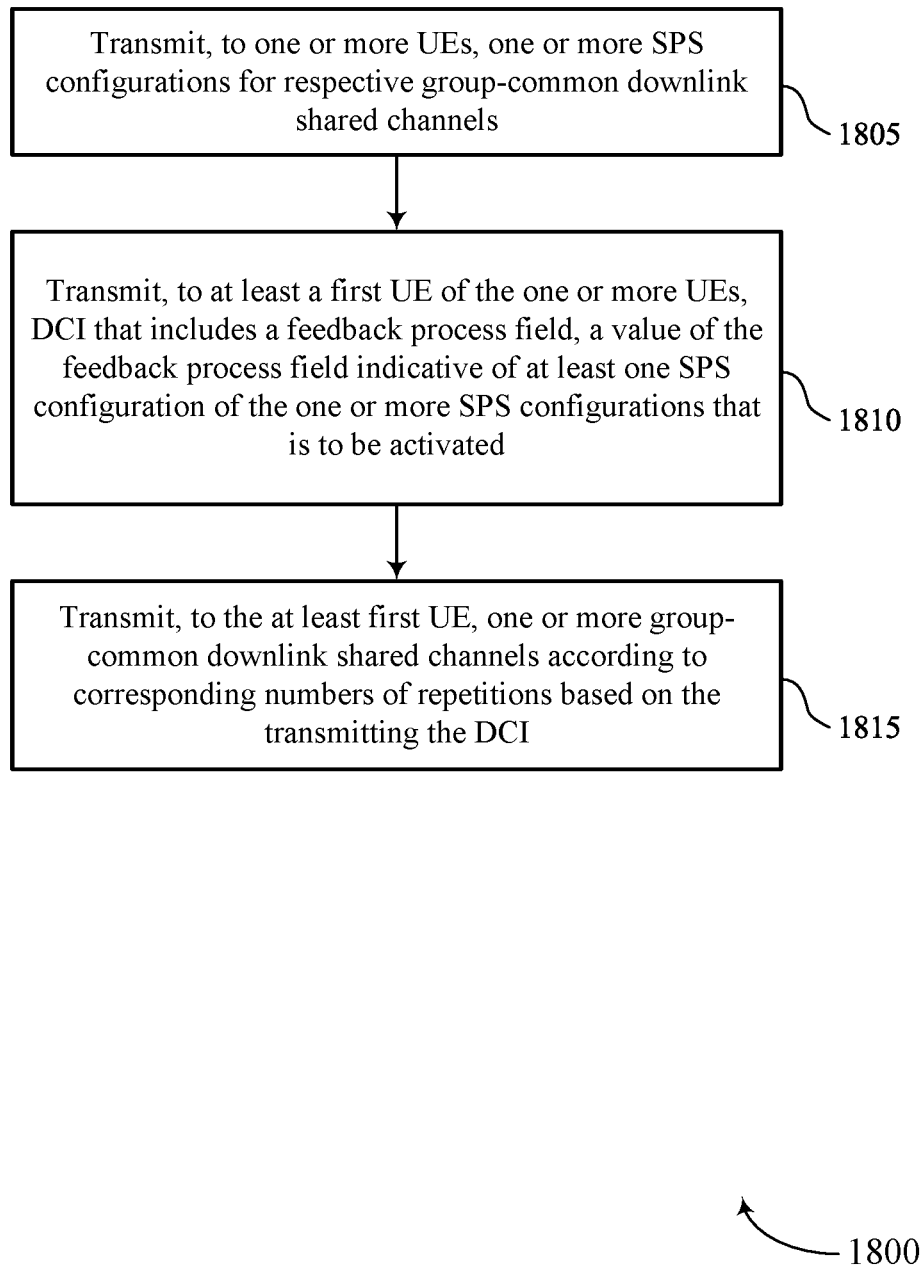

FIG. 18 shows a flowchart illustrating a method 1800 that supports activation and release for group-common downlink channels with repetitions in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to one or more user equipment (UEs), one or more semi-persistent scheduling configurations for respective group-common downlink shared channels. The operations of 1805 may be performed in accordance with examples as disclosed herein. In some examples, aspects of the operations of 1805 may be performed by an SPS configuration component 1125 as described with reference to FIG. 11.

At 1810, the method may include transmitting, to at least a first UE of the one or more UEs, downlink control information that includes a feedback process field, a value of the feedback process field indicative of at least one semi-persistent scheduling configuration of the one or more semi-persistent scheduling configurations that is to be activated. The operations of 1810 may be performed in accordance with examples as disclosed herein. In some examples, aspects of the operations of 1810 may be performed by an SPS activation component 1130 as described with reference to FIG. 11.

At 1815, the method may include transmitting, to the at least first UE, one or more group-common downlink shared channels according to corresponding numbers of repetitions based on the transmitting the downlink control information. The operations of 1815 may be performed in accordance with examples as disclosed herein. In some examples, aspects of the operations of 1815 may be performed by an SPS downlink channel transmission component 1135 as described with reference to FIG. 11.

Figure 19:
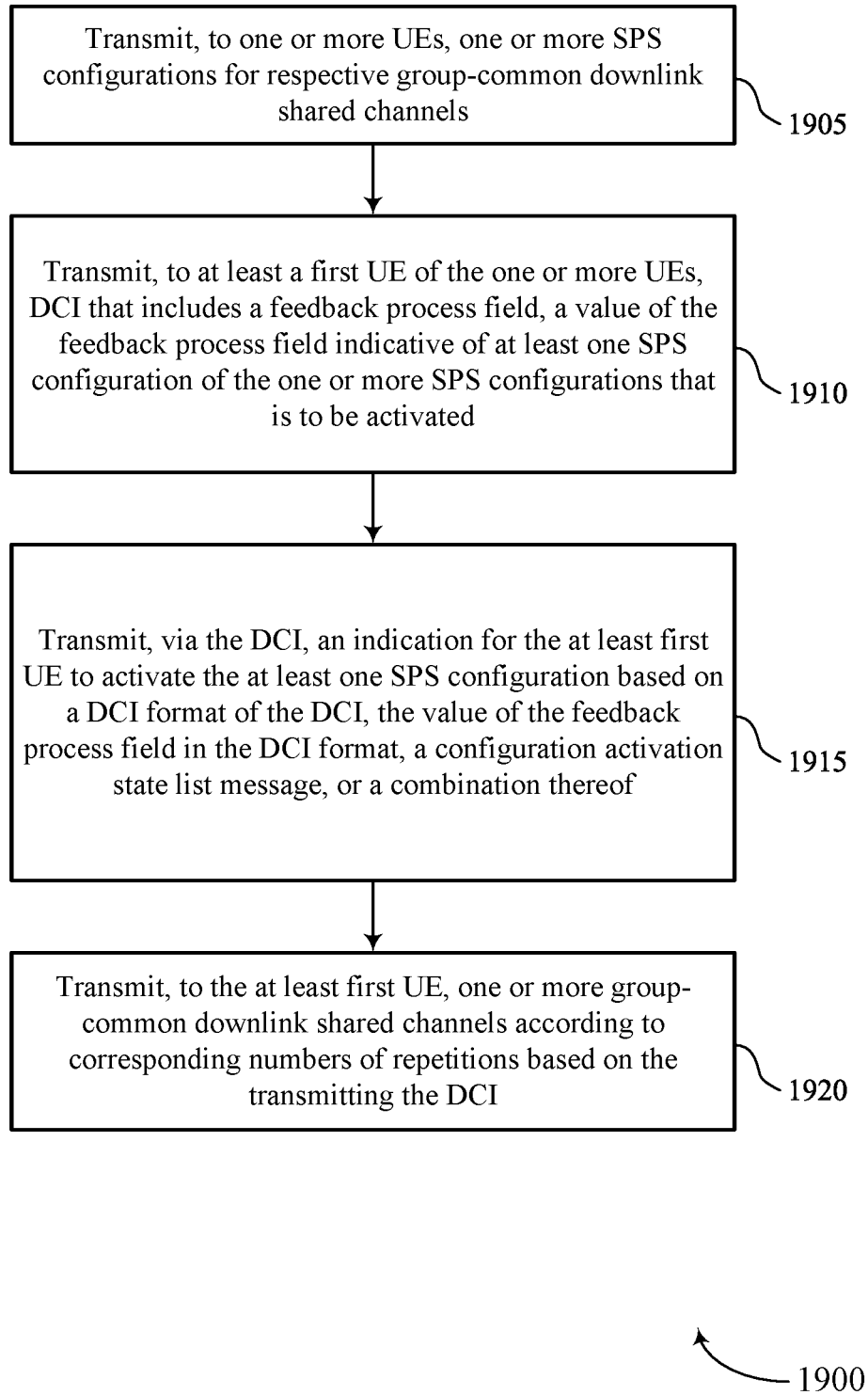

FIG. 19 shows a flowchart illustrating a method 1900 that supports activation and release for group-common downlink channels with repetitions in accordance with aspects of the present disclosure. The operations of the method 1900 may be implemented by a base station or its components as described herein. For example, the operations of the method 1900 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1905, the method may include transmitting, to one or more user equipment (UEs), one or more semi-persistent scheduling configurations for respective group-common downlink shared channels. The operations of 1905 may be performed in accordance with examples as disclosed herein. In some examples, aspects of the operations of 1905 may be performed by an SPS configuration component 1125 as described with reference to FIG. 11.

At 1910, the method may include transmitting, to at least a first UE of the one or more UEs, downlink control information that includes a feedback process field, a value of the feedback process field indicative of at least one semi-persistent scheduling configuration of the one or more semi-persistent scheduling configurations that is to be activated. The operations of 1910 may be performed in accordance with examples as disclosed herein. In some examples, aspects of the operations of 1910 may be performed by an SPS activation component 1130 as described with reference to FIG. 11.

At 1915, the method may include transmitting, via the downlink control information, an indication for the at least first UE to activate the at least one semi-persistent scheduling configuration based on a downlink control information format of the downlink control information, the value of the feedback process field in the downlink control information format, a configuration activation state list message, or a combination thereof. The operations of 1915 may be performed in accordance with examples as disclosed herein. In some examples, aspects of the operations of 1915 may be performed by an SPS activation component 1130 as described with reference to FIG. 11.

At 1920, the method may include transmitting, to the at least first UE, one or more group-common downlink shared channels according to corresponding numbers of repetitions based on the transmitting the downlink control information. The operations of 1920 may be performed in accordance with examples as disclosed herein. In some examples, aspects of the operations of 1920 may be performed by an SPS downlink channel transmission component 1135 as described with reference to FIG. 11.

The following provides an overview of aspects of the present disclosure:

Aspect 1: A method for wireless communications at a UE, comprising: receiving, from a base station, one or more semi-persistent scheduling configurations for respective group-common downlink shared channels; receiving downlink control information that includes a feedback process field, a value of the feedback process field indicative of at least one semi-persistent scheduling configuration of the one or more semi-persistent scheduling configurations that is to be activated; and monitoring for the one or more group-common downlink shared channels from the base station based at least in part on the value of the feedback process field in the downlink control information.

Aspect 2: The method of aspect 1, further comprising: determining to activate the at least one semi-persistent scheduling configuration based at least in part on a downlink control information format of the downlink control information, the value of the feedback process field in the downlink control information format, a configuration activation state list message, or a combination thereof.

Aspect 3: The method of any of aspects 1 through 2, wherein receiving the downlink control information comprises: receiving a group-common downlink control channel comprising the downlink control information.

Aspect 4: The method of aspect 3, wherein the group-common downlink control channel comprises an indication to activate monitoring resources configured for at least one or more group-common semi-persistent downlink shared channels.

Aspect 5: The method of any of aspects 1 through 2, wherein receiving the downlink control information comprises: receiving a UE-specific downlink control channel configured for the UE comprising the downlink control information.

Aspect 6: The method of aspect 5, wherein the UE-specific downlink control channel comprises an indication to activate monitoring resources configured for at least one or more UE-specific semi-persistent downlink shared channels, one or more group-common semi-persistent downlink shared channels, or a combination thereof.

Aspect 7: The method of any of aspects 1 through 6, further comprising: receiving, from the base station, a deactivation message comprising an indication to release the at least one activated semi-persistent scheduling configuration; and releasing the at least one activated semi-persistent scheduling configuration based at least in part on receiving the deactivation message.

Aspect 8: The method of aspect 7, further comprising: determining to release the at least one activated semi-persistent scheduling configuration based at least in part on a common frequency resource, a configuration deactivation state list message, a downlink control information format of the deactivation message, a feedback process field in the downlink control information format, or a combination thereof.

Aspect 9: The method of any of aspects 7 through 8, wherein receiving the deactivation message comprises: receiving a group-common downlink control channel comprising the deactivation message.

Aspect 10: The method of aspect 9, wherein the deactivation message comprises an indication to release monitoring resources configured for at least one or more group-common semi-persistent downlink shared channels.

Aspect 11: The method of any of aspects 7 through 8, wherein receiving the deactivation message comprises: receiving a UE-specific downlink control channel comprising the deactivation message.

Aspect 12: The method of aspect 11, wherein the deactivation message comprises an indication to release monitoring resources configured for at least one or more UE-specific semi-persistent downlink shared channels, one or more group-common semi-persistent downlink shared channels, or a combination thereof.

Aspect 13: The method of any of aspects 7 through 12, further comprising: transmitting, to the base station, an acknowledgment feedback message to acknowledge release of the at least one activated semi-persistent scheduling configuration.

Aspect 14: The method of aspect 13, further comprising: determining a bit location of the acknowledgment feedback message based at least in part on a time domain resource allocation table row index received in the downlink control information, a feedback timing indicator field value received in the deactivation message, or a combination thereof.

Aspect 15: The method of any of aspects 13 through 14, wherein transmitting the acknowledgment feedback message comprises: transmitting the acknowledgment feedback message comprising a single bit to acknowledge release of one or more activated semi-persistent scheduling configurations for group-common downlink shared channels, to acknowledge release of one or more activated semi-persistent scheduling configurations for UE-specific downlink shared channels, or both.

Aspect 16: The method of any of aspects 13 through 14, wherein transmitting the acknowledgment feedback message comprises: transmitting the acknowledgment feedback message comprising a first bit to acknowledge release of one or more activated semi-persistent scheduling configurations for UE-specific downlink shared channels and a second bit to acknowledge release of one or more activated semi-persistent scheduling configurations for group-common downlink shared channels.

Aspect 17: The method of any of aspects 1 through 16, further comprising: receiving, from the base station, a configuration of an acknowledgment feedback mode for transmitting acknowledgment feedback to indicate whether the downlink control information is successfully received or not, whether a deactivation message is successfully received or not, or both.

Aspect 18: The method of aspect 17, wherein the acknowledgment feedback mode comprises a positive feedback and negative feedback mode, a negative feedback mode, a no feedback mode, or a combination thereof.

Aspect 19: The method of any of aspects 17 through 18, wherein the configuration of the acknowledgment feedback mode is different than a configuration for acknowledgment feedback for a group-common downlink shared channel associated with a dynamic grant, for a group-common downlink shared channel associated with a configured grant, for a retransmission of semi-persistent group-common downlink shared channels, or a combination thereof.

Aspect 20: The method of any of aspects 17 through 19, wherein the configuration of the acknowledgment feedback mode is a positive feedback and negative feedback mode for an activation or deactivation message for semi-persistent group-common downlink shared channels.

Aspect 21: A method for wireless communications at a base station, comprising: transmitting, to one or more user equipment (UEs), one or more semi-persistent scheduling configurations for respective group-common downlink shared channels; transmitting, to at least a first UE of the one or more UEs, downlink control information that includes a feedback process field, a value of the feedback process field indicative of at least one semi-persistent scheduling configuration of the one or more semi-persistent scheduling configurations that is to be activated; and transmitting, to the at least first UE, one or more group-common downlink shared channels according to corresponding numbers of repetitions based at least in part on the transmitting the downlink control information.

Aspect 22: The method of aspect 21, wherein transmitting the downlink control information comprises: transmitting, via the downlink control information, an indication for the at least first UE to activate the at least one semi-persistent scheduling configuration based at least in part on a downlink control information format of the downlink control information, the value of the feedback process field in the downlink control information format, a configuration activation state list message, or a combination thereof.

Aspect 23: The method of any of aspects 21 through 22, wherein transmitting the downlink control information comprises: transmitting a group-common downlink control channel comprising the downlink control information.

Aspect 24: The method of aspect 23, wherein the group-common downlink control channel comprises an indication to activate monitoring resources configured for at least one or more group-common semi-persistent downlink shared channels.

Aspect 25: The method of any of aspects 21 through 22, wherein transmitting the downlink control information comprises: transmitting a UE-specific downlink control channel configured for the UE comprising the downlink control information.

Aspect 26: The method of aspect 25, wherein the UE-specific downlink control channel comprises an indication for the at least first UE to activate monitoring resources configured for at least one or more UE-specific semi-persistent downlink shared channels, one or more group-common semi-persistent downlink shared channels, or a combination thereof.

Aspect 27: The method of any of aspects 21 through 26, further comprising: transmitting, to the at least first UE, a deactivation message comprising an indication to release the at least one activated semi-persistent scheduling configuration.

Aspect 28: The method of aspect 27, wherein the deactivation message indicates for the at least first UE to release the at least one activated semi-persistent scheduling configuration based at least in part on a configuration deactivation state list message, a downlink control information format of the deactivation message, a feedback process field in the downlink control information format, or a combination thereof.

Aspect 29: The method of any of aspects 27 through 28, wherein transmitting the deactivation message comprises: transmitting a group-common downlink control channel comprising the deactivation message.

Aspect 30: The method of aspect 29, wherein the deactivation message comprises an indication for the at least first UE to release monitoring resources configured for at least one or more group-common semi-persistent downlink shared channels.

Aspect 31: The method of any of aspects 27 through 28, wherein transmitting the deactivation message comprises: transmitting a UE-specific downlink control channel comprising the deactivation message.

Aspect 32: The method of aspect 31, wherein the deactivation message comprises an indication for the at least first UE to release monitoring resources configured for at least one or more UE-specific semi-persistent downlink shared channels, one or more group-common semi-persistent downlink shared channels, or a combination thereof.

Aspect 33: The method of any of aspects 27 through 32, further comprising: receiving, from the at least first UE, an acknowledgment feedback message to acknowledge release of the at least one activated semi-persistent scheduling configuration.

Aspect 34: The method of aspect 33, wherein a bit location of the acknowledgment feedback message is based at least in part on a time domain resource allocation table row index received in the downlink control information, a feedback timing indicator field value received in the deactivation message, or a combination thereof.

Aspect 35: The method of any of aspects 33 through 34, wherein receiving the acknowledgment feedback message comprises: receiving the acknowledgment feedback message comprising a single bit to acknowledge release of one or more activated semi-persistent scheduling configurations for group-common downlink shared channels, to acknowledge release of one or more activated semi-persistent scheduling configurations for UE-specific downlink shared channels, or both.

Aspect 36: The method of any of aspects 33 through 34, wherein receiving the acknowledgment feedback message comprises: receiving the acknowledgment feedback message comprising a first bit to acknowledge release of one or more activated semi-persistent scheduling configurations for UE-specific downlink shared channels and a second bit to acknowledge release of one or more activated semi-persistent scheduling configurations for group-common downlink shared channels.

Aspect 37: The method of any of aspects 21 through 36, further comprising: transmitting, to the at least first UE, a configuration of an acknowledgment feedback mode for transmitting acknowledgment feedback to indicate whether the downlink control information is successfully received or not, whether a deactivation message is successfully received or not, or both.

Aspect 38: The method of aspect 37, wherein the acknowledgment feedback mode comprises a positive feedback and negative feedback mode, a negative feedback mode, a no feedback mode, or a combination thereof.

Aspect 39: The method of any of aspects 37 through 38, wherein the configuration of the acknowledgment feedback mode is different than a configuration for acknowledgment feedback for a group-common downlink shared channel associated with a dynamic grant, for a group-common downlink shared channel associated with a configured grant, for a retransmission of semi-persistent group-common downlink shared channels, or a combination thereof.

Aspect 40: The method of any of aspects 37 through 39, wherein the configuration of the acknowledgment feedback mode is a positive feedback and negative feedback mode for an activation or deactivation message for semi-persistent group-common downlink shared channels.

Aspect 41: An apparatus for wireless communications at a UE, comprising a processor; memory coupled with the processor; and instructions stored in the memory and executable by the processor to cause the apparatus to perform a method of any of aspects 1 through 20.

Aspect 42: An apparatus for wireless communications at a UE, comprising at least one means for performing a method of any of aspects 1 through 20.

Aspect 43: A non-transitory computer-readable medium storing code for wireless communications at a UE, the code comprising instructions executable by a processor to perform a method of any of aspects 1 through 20.

Aspect 44: An apparatus for wireless communications at a base station, comprising a processor; memory coupled with the processor; and instructions stored in the memory and executable by the processor to cause the apparatus to perform a method of any of aspects 21 through 40.

Aspect 45: An apparatus for wireless communications at a base station, comprising at least one means for performing a method of any of aspects 21 through 40.

Aspect 46: A non-transitory computer-readable medium storing code for wireless communications at a base station, the code comprising instructions executable by a processor to perform a method of any of aspects 21 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network entity, one or more semi-persistent scheduling configurations for respective one or more group-common downlink shared channels;
   receiving downlink control information that includes a feedback process field, a value of the feedback process field indicative of at least one semi-persistent scheduling configuration of the one or more semi-persistent scheduling configurations that is to be activated or released;
   monitoring for the one or more group-common downlink shared channels from the network entity based at least in part on the value of the feedback process field in the downlink control information; and
   transmitting an acknowledgment feedback message comprising a bit to acknowledge release of one or more activated semi-persistent scheduling configurations for UE-specific downlink shared channels and the one or more group-common downlink shared channels.

2. The method of claim 1, further comprising:
   determining to activate the at least one semi-persistent scheduling configuration based at least in part on a downlink control information format of the downlink control information, the value of the feedback process field in the downlink control information format, a configuration activation state list message, or a combination thereof.

3. The method of claim 1, wherein receiving the downlink control information comprises:
   receiving a group-common downlink control channel comprising the downlink control information.

4. The method of claim 3, wherein the group-common downlink control channel comprises an indication to activate monitoring resources configured for at least one or more group-common semi-persistent downlink shared channels.

5. The method of claim 1, wherein receiving the downlink control information comprises:
   receiving a UE-specific downlink control channel configured for the UE comprising the downlink control information.

6. The method of claim 5, wherein the UE-specific downlink control channel comprises an indication to activate monitoring resources configured for at least one or more UE-specific semi-persistent downlink shared channels, one or more group-common semi-persistent downlink shared channels, or a combination thereof.

7. The method of claim 6, further comprising:
   receiving, from the network entity, a deactivation message comprising an indication to release the at least one activated semi-persistent scheduling configuration; and
   releasing the at least one activated semi-persistent scheduling configuration based at least in part on receiving the deactivation message.

8. The method of claim 7, further comprising:
   determining to release the at least one activated semi-persistent scheduling configuration based at least in part on a common frequency resource, a configuration deactivation state list message, a downlink control information format of the deactivation message, a feedback process field in the downlink control information format, or a combination thereof.

9. The method of claim 7, wherein receiving the deactivation message comprises:
   receiving a group-common downlink control channel comprising the deactivation message.

10. The method of claim 9, wherein the deactivation message comprises an indication to release monitoring resources configured for at least one or more group-common semi-persistent downlink shared channels.

11. The method of claim 7, wherein receiving the deactivation message comprises:
   receiving a UE-specific downlink control channel comprising the deactivation message.

12. The method of claim 11, wherein the deactivation message comprises an indication to release monitoring resources configured for at least one or more UE-specific semi-persistent downlink shared channels, one or more group-common semi-persistent downlink shared channels, or a combination thereof.

13. The method of claim 7, further comprising:
   transmitting, to the network entity, the acknowledgment feedback message to acknowledge release of the at least one activated semi-persistent scheduling configuration.

14. The method of claim 13, further comprising:
   determining a bit location of the acknowledgment feedback message based at least in part on a time domain resource allocation table row index received in the downlink control information, a feedback timing indicator field value received in the deactivation message, or a combination thereof.

15. The method of claim 1, further comprising:
   receiving, from the network entity, a configuration of an acknowledgment feedback mode for transmitting acknowledgment feedback to indicate whether the downlink control information is successfully received or not, whether a deactivation message is successfully received or not, or both.

16. The method of claim 15, wherein the acknowledgment feedback mode comprises a positive feedback and negative feedback mode, a negative feedback mode, a no feedback mode, or a combination thereof.

17. The method of claim 15, wherein the configuration of the acknowledgment feedback mode is different than a configuration for acknowledgment feedback for a group-common downlink shared channel associated with a dynamic grant, for a group-common downlink shared channel associated with a configured grant, for a retransmission of semi-persistent group-common downlink shared channels, or a combination thereof.

18. The method of claim 15, wherein the configuration of the acknowledgment feedback mode is a positive feedback and negative feedback mode for an activation or deactivation message for semi-persistent group-common downlink shared channels.

19. A method for wireless communications at a network entity, comprising:
transmitting, to one or more user equipment (UEs), one or more semi-persistent scheduling configurations for respective group-common downlink shared channels;
transmitting, to at least a first UE of the one or more UEs, downlink control information that includes a feedback process field, a value of the feedback process field indicative of at least one semi-persistent scheduling configuration of the one or more semi-persistent scheduling configurations that is to be activated or released;
transmitting, to the at least first UE, one or more group-common downlink shared channels according to corresponding numbers of repetitions based at least in part on the transmitting the downlink control information; and
receiving an acknowledgment feedback message comprising a bit to acknowledge release of one or more activated semi-persistent scheduling configurations for UE-specific downlink shared channels and the one or more group-common downlink shared channels.

20. The method of claim 19, wherein transmitting the downlink control information comprises:
transmitting, via the downlink control information, an indication for the at least first UE to activate the at least one semi-persistent scheduling configuration based at least in part on a downlink control information format of the downlink control information, the value of the feedback process field in the downlink control information format, a configuration activation state list message, or a combination thereof.

21. The method of claim 19, wherein transmitting the downlink control information comprises:
transmitting a group-common downlink control channel comprising the downlink control information.

22. The method of claim 19, wherein transmitting the downlink control information comprises:
transmitting a UE-specific downlink control channel configured for the UE comprising the downlink control information.

23. The method of claim 19, further comprising:
transmitting, to the at least first UE, a deactivation message comprising an indication to release the at least one activated semi-persistent scheduling configuration.

24. The method of claim 23, wherein transmitting the deactivation message comprises:
transmitting a group-common downlink control channel comprising the deactivation message.

25. The method of claim 23, wherein transmitting the deactivation message comprises:
transmitting a UE-specific downlink control channel comprising the deactivation message.

26. The method of claim 23, further comprising:
receiving, from the at least first UE, the acknowledgment feedback message to acknowledge release of the at least one activated semi-persistent scheduling configuration.

27. User equipment (UE) for wireless communications, comprising:
one or more processors;
one or more memories coupled with the one or more processors; and
instructions stored in the memory and executable by the one or more processors to cause the UE to:
receive, from a network entity, one or more semi-persistent scheduling configurations for respective one or more group-common downlink shared channels;
receive downlink control information that includes a feedback process field, a value of the feedback process field indicative of at least one semi-persistent scheduling configuration of the one or more semi-persistent scheduling configurations that is to be activated or released;
monitor for the one or more group-common downlink shared channels from the network entity based at least in part on the value of the feedback process field in the downlink control information; and
transmit an acknowledgment feedback message comprising a bit to acknowledge release of one or more activated semi-persistent scheduling configurations for UE-specific downlink shared channels and the one or more group-common downlink shared channels.

28. Network entity for wireless communications, comprising:
one or more processors;
one or more memories coupled with the one or more processors; and
instructions stored in the memory and executable by the one or more processors to cause the network entity to:
transmit, to one or more user equipment (UEs), one or more semi-persistent scheduling configurations for respective group-common downlink shared channels;
transmit, to at least a first UE of the one or more UEs, downlink control information that includes a feedback process field, a value of the feedback process field indicative of at least one semi-persistent scheduling configuration of the one or more semi-persistent scheduling configurations that is to be activated or released;
transmit, to the at least first UE, one or more group-common downlink shared channels according to corresponding numbers of repetitions based at least in part on the transmitting the downlink control information; and
receive an acknowledgment feedback message comprising a bit to acknowledge release of one or more activated semi-persistent scheduling configurations for UE-specific downlink shared channels and the one or more group-common downlink shared channels.

* * * * *